United States Patent
Konaka

(10) Patent No.: US 7,191,177 B2
(45) Date of Patent: Mar. 13, 2007

(54) KEYWORD EXTRACTING DEVICE

(75) Inventor: Hiroki Konaka, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 309 days.

(21) Appl. No.: 09/945,677

(22) Filed: Sep. 5, 2001

(65) Prior Publication Data

US 2002/0042794 A1    Apr. 11, 2002

Related U.S. Application Data

(63) Continuation of application No. PCT/JP00/05433, filed on Aug. 14, 2000.

(30) Foreign Application Priority Data

Jan. 5, 2000    (JP)    ............................ 2000-000382

(51) Int. Cl.
    *G06F 17/30*    (2006.01)
(52) U.S. Cl. ...................... 707/6; 707/3; 707/4; 707/5; 707/10
(58) Field of Classification Search ................. 707/7, 707/10, 3–6; 704/9, 10
    See application file for complete search history.

(56) References Cited

U.S. PATENT DOCUMENTS

| | | | | |
|---|---|---|---|---|
| 5,640,575 A | * | 6/1997 | Maruyama et al. | 707/6 |
| 5,825,926 A | * | 10/1998 | Tanaka | 382/229 |
| 5,842,159 A | * | 11/1998 | Nakamura et al. | 704/4 |
| 5,845,143 A | * | 12/1998 | Yamauchi et al. | 707/6 |
| 5,907,841 A | | 5/1999 | Sumita et al. | |
| 5,963,940 A | | 10/1999 | Liddy et al. | |
| 5,978,801 A | * | 11/1999 | Yuasa | 707/6 |
| 6,173,251 B1 | | 1/2001 | Ito et al. | |
| 6,314,410 B1 | * | 11/2001 | Tackett et al. | 706/11 |
| 6,327,561 B1 | * | 12/2001 | Smith et al. | 704/9 |

(Continued)

FOREIGN PATENT DOCUMENTS

JP    7-73200    3/1995

(Continued)

OTHER PUBLICATIONS

N. Ziviani, Modern Information Retrieval, Harlow: Addison-Wesley, XP-002287648, pp. 163-190, "Text Operations", 1999.

(Continued)

*Primary Examiner*—Cam-Y Truong
(74) *Attorney, Agent, or Firm*—Oblon, Spivak, McClelland, Maier & Neustadt, P.C.

(57) ABSTRACT

A keyword extracting device which extracts keywords collectively and efficiently while improving descriptive property and reusability of the information for keyword extracting. A text data input inputs a text. A pattern processor carries out matching and replacement of a character string based on a pattern in regular expression or its equivalent. A pattern storage stores at least a keyword component pattern representing a character string capable of being a component of a keyword. A keyword component extractor extracts, as keyword components, all character strings which are matched with a keyword component pattern and are not overlapped with each other by using the pattern processor for a text. A keyword candidate set generator generates a keyword candidate set from each keyword. And, a keyword output outputs each keyword candidate of a keyword candidate set as a keyword.

17 Claims, 11 Drawing Sheets

U.S. PATENT DOCUMENTS

| | | | |
|---|---|---|---|
| 6,446,076 B1 * | 9/2002 | Burkey et al. | 707/102 |
| 6,654,741 B1 * | 11/2003 | Cohen et al. | 707/6 |
| 6,826,553 B1 * | 11/2004 | DaCosta et al. | 707/1 |
| 6,850,252 B1 * | 2/2005 | Hoffberg | 715/716 |

FOREIGN PATENT DOCUMENTS

| | | |
|---|---|---|
| JP | 8-221440 | 8/1996 |
| JP | 8-329108 | 12/1996 |
| JP | 9-128399 | 5/1997 |
| JP | 10-283355 | 10/1998 |
| JP | 11-53384 | 2/1999 |
| JP | 11-259524 | 9/1999 |
| WO | WO 98/59303 | 12/1998 |

OTHER PUBLICATIONS

Y. Ogawa, et al., Joho Shori Gakkai Kenkyo Hokoku, vol. 93, No. 79 (93-NL-97), pp. 103-110, "Fukugougo Key Word no Jidou Chushutsuhou" (a copy will be submitted later).

Iizuka, Yasuki "Japanese Word Segmentation Using Textual Analysis for Full Text Search" Natural Word Processing, 132-9 (Jul. 23, 1999) (English translation-in-part).

Ogawa, Yasushi, et al. "A Compound Keyword Assignment Method for Japanese Texts" Information and Communication R&D Center, Ricoh Co., Ltd. vol. 93, No. 79 (English translation-in-part).

* cited by examiner

KEYWORD EXTRACTING DEVICE

TECHNICAL FIELD

The present invention relates to a keyword extracting device for extracting a keyword from a text.

BACKGROUND ART

FIG. 11 is a diagram showing the structure of a conventional keyword extracting device described in Japanese Unexamined Patent Publication No. 334102/1998, for example. In FIG. 11, 1 denotes a database, 2 denotes a primary keyword extractor, 3 denotes a character information section, 4 denotes a primary keyword storage section, 5 denotes an unnecessary word removing section, and 6 denotes a keyword storage section.

Next, an operation will be described. Based on the information of the character information section 3 determining the type of characters to be keywords, the primary keyword extractor 2 extracts a character string to be a primary keyword from the database 1 and stores the character string in the primary keyword storage section 4. The unnecessary word removing section 5 removes, as an unnecessary word, a primary keyword which can be described as a coupling of the other primary keyword (that is, a synthetic word) and stores residual keywords in the keyword storage section.

Moreover, there has also been described the unnecessary word removing section 5 removes a primary keyword for one character, removes a prestored prefix and suffix to carry out an unnecessary word removing processing and does not remove a synthetic word that is previously registered or frequently appears.

The conventional keyword extracting device is based on character information. Therefore, it has been difficult to extract a keyword concerning a plurality of character types. Referring to a portion which can be so identified as not to be a keyword, moreover, a keyword extracting processing is carried out. As a result of an unnecessary processing, therefore, there has also been a possibility that a keyword might be extracted erroneously. Furthermore, information about a synthetic word to be a keyword, an unnecessary primary keyword, a prefix and a suffix are stored/defined as a character string or a simple character number. Accordingly, there has also been a problem in that flexibility and simplicity of description cannot be obtained, a portion which is not prefix or suffix is deleted by mistake or a character string for one character to be a keyword cannot be extracted. Moreover, it is also impossible to modularize the information corresponding to a field and document type and the like and to combine them for use if necessary. The reusability of the information is poor.

The present invention has been made to solve the above-mentioned problems and has an object to obtain a keyword extracting device for efficiently extracting a keyword with high precision while enhancing descriptive properties and reusability of information about keyword extraction.

DISCLOSURE OF INVENTION

A keyword extracting device according to a first aspect of the present invention is characterized by text data input means for inputting a text, pattern processing means for carrying out matching and replacement of a character string based on a pattern in regular expression or its equivalent, pattern storage means having at least a keyword component pattern representing a character string capable of being a component of a keyword, keyword component extracting means for extracting, as keyword components, all character strings which are matched with the keyword component pattern and are not overlapped with each other by using the pattern processing means for a text, keyword candidate set generating means for generating a keyword candidate set from each keyword component, and keyword output means for outputting each keyword candidate of a keyword candidate set as a keyword.

A keyword extracting device according to a second aspect of the present invention is characterized by keyword candidate set generating means for generating a keyword candidate set by exactly using each keyword component as a keyword candidate.

A keyword extracting device according to a third aspect of the present invention is characterized by keyword component extracting means for recording an extracting position while extracting, as keyword components, all character strings which are matched with a keyword component pattern and are not overlapped with each other by using the pattern processing means for a text, and keyword candidate set generating means for generating a keyword candidate set by coupling, as one keyword candidate, keyword components decided to be continuous with a character string length of each keyword component from the extracting position over a text and exactly using a single keyword component as a keyword candidate.

A keyword extracting device according to a fourth aspect of the present invention is characterized by keyword candidate set generating means for generating a keyword candidate set by using continuous keyword components over a text as a single keyword candidate respectively and coupling the preceding keyword component with the following keyword component to make a keyword candidate, while exactly using a single keyword component as a keyword candidate.

A keyword extracting device according to a fifth aspect of the present invention is characterized by keyword candidate set generating means for collecting, into one, repeated keyword candidates in a keyword candidate set.

A keyword extracting device according to a sixth aspect of the present invention is characterized by pattern storage means having at least a keyword component pattern representing a character string capable of being a component of a keyword and a non-keyword candidate pattern representing a portion which cannot be a candidate of a keyword, and non-keyword removing means for searching all character strings which are matched with the non-keyword candidate pattern and are not overlapped with each other and for replacing the character string with a special character string with which any pattern is never matched by using the pattern processing means for a text.

A keyword extracting device according to a seventh aspect of the present invention is characterized by pattern storage means having at least a keyword component pattern representing a character string capable of being a component of a keyword and an extra keyword component pattern representing a keyword component which is hard to cover with the keyword component pattern, extra keyword component extracting means for extracting, as extra keyword components, all character strings which are matched with the extra keyword component pattern and are not overlapped with each other, recording an extracting position, and converting each character string matched in a text into a special character string with which any pattern is never matched by using the pattern processing means for a text, and keyword candidate set generating means for generating a keyword candidate set from the keyword component and the extra keyword component.

A keyword extracting device according to an eighth aspect of the present invention is characterized by pattern storage means having at least a keyword component pattern representing a character string capable of being a component of a keyword and an unnecessary word pattern representing an unnecessary word, and unnecessary word removing means for removing an unnecessary word matched with the unnecessary word pattern from a keyword candidate set by using the pattern processing means for a whole character string of each keyword candidate of the keyword candidate set.

A keyword extracting device according to a ninth aspect of the present invention is characterized by pattern storage means having at least a keyword component pattern representing a character string capable of being a component of a keyword, a necessary word pattern representing a necessary word and an unnecessary word pattern representing an unnecessary word, and unnecessary word removing means for removing an unnecessary word which is not matched with the necessary word pattern but is matched with the unnecessary word pattern from a keyword candidate set by using the pattern processing means for a whole character string of each keyword candidate of the keyword candidate set.

A keyword extracting device according to a tenth aspect of the present invention is characterized by pattern storage means having at least a keyword component pattern representing a character string capable of being a component of a keyword and an unnecessary head pattern representing an unnecessary head character string, and unnecessary head character string removing means for removing a portion matched with the unnecessary head pattern from a keyword candidate matched with the unnecessary head pattern, by using the pattern processing means for a head character string of each keyword candidate of the keyword candidate set, if this removal results in an empty character string, the original keyword candidate is deleted from a keyword candidate set. If the result of this removal is not an empty character string, the original keyword candidate is replaced by a keyword candidate in which an unnecessary head character string is removed.

A keyword extracting device according to an eleventh aspect of the present invention is characterized by pattern storage means having at least a keyword component pattern representing a character string capable of being a component of a keyword, an unnecessary head pattern representing an unnecessary head character string and a necessary head pattern representing a necessary head character string, and unnecessary head character string removing means for removing a portion matched with the unnecessary head pattern from a keyword candidate which is not matched with the necessary head pattern but is matched with the unnecessary head pattern, by using the pattern processing means for a head character string of each keyword candidate of the keyword candidate set, if this removal results in an empty character string, the original keyword candidate is deleted from a keyword candidate set. If the result of this removal is not an empty character string, the original keyword candidate is replaced by a keyword candidate in which an unnecessary head character string is removed.

A keyword extracting device according to a twelfth aspect of the present invention is characterized by pattern storage means having at least a keyword component pattern representing a character string capable of being a component of a keyword and an unnecessary end pattern representing an unnecessary end character string, and unnecessary end character string removing means for removing a portion matched with the unnecessary end pattern from a keyword candidate matched with the unnecessary end pattern, by using the pattern processing means for an end character string of each keyword candidate of the keyword candidate set, if this removal results in an empty character string, the original keyword candidate is deleted from a keyword candidate set. If the result of this removal is not an empty character string, the original keyword candidate is replaced by a keyword candidate in which an unnecessary end character string is removed.

A keyword extracting device according to a thirteenth aspect of the present invention is characterized by pattern storage means having at least a keyword component pattern representing a character string capable of being a component of a keyword, an unnecessary end pattern representing an unnecessary end character string and a necessary end pattern representing a necessary end character string, and unnecessary end character string removing means for removing a portion matched with the unnecessary end pattern from a keyword candidate which is not matched with the necessary end pattern but is matched with the unnecessary end pattern, by using the pattern processing means for an end character string of each keyword candidate of the keyword candidate set, if this removal results in an empty character string, the original keyword candidate is deleted from a keyword candidate set. If the result of this removal is not an empty character string, the original keyword candidate is replaced by a keyword candidate in which an unnecessary end character string is removed.

A keyword extracting device according to a fourteenth aspect of the present invention is characterized in that a keyword candidate, which is finally removed from a candidate set by applying two of the unnecessary word removing means, the unnecessary head character string removing means and the unnecessary end character string removing means or more in combination or by applying either the unnecessary head character string removing means or the unnecessary end character string removing means twice or more, is added to a selection choice of the unnecessary word pattern.

A keyword extracting device according to a fifteenth aspect of the present invention is characterized by a plurality of pattern storage means corresponding to a type and field of a text, a kind of a stored pattern and the like, and pattern processing means for simultaneously applying the same kind of patterns stored in each pattern storage means when applying various patterns and for setting, as a matching result, the longest character string which is matched at the headmost position in the text.

A keyword extracting device according to a sixteenth aspect of the present invention is characterized by pattern processing means for simultaneously applying a pattern stored in each pattern storage means and for setting, as a matching result, a character string matched with any pattern, thereby stopping application of other patterns, in relation to an unnecessary word pattern and a necessary word pattern.

A keyword extracting device according to a seventeenth aspect of the present invention is characterized by a plurality of pattern storage means corresponding to a type and field of a text, a kind of a stored pattern and the like, and pattern integrating means for expanding selection, concatenation, repetition and the like in a pattern if necessary, and for integrating and outputting, for each kind of pattern, various patterns stored in the pattern storage means while sorting components of a pattern in relation to a character string length which might be matched.

A keyword extracting device according to an eighteenth aspect of the present invention is characterized by pattern integrating means for providing an upper limit for a character string length which might be matched, and for integrating and outputting, for each kind of pattern, various patterns stored in the pattern storage means while removing a component of a pattern which exceeds the upper limit.

A keyword extracting device according to a nineteenth aspect of the present invention is characterized by pattern integrating means for providing an upper limit of the number of expansions for the repetition of patterns to exclude the repetition of a pattern which exceeds the upper limit, thereby integrating and outputting, for each kind of pattern, various patterns stored in the pattern storage means.

A keyword extracting device according to a twentieth aspect of the present invention is characterized by pattern integrating means for outputting a pattern having, as a selection choice, a pattern stored in each pattern storage means in relation to an unnecessary word pattern and a necessary word pattern.

A keyword extracting device according to a twenty-first aspect of the present invention is characterized by text data input means for inputting a text, part-of-speech analyzing means to analyze a part-of-speech of each word in the input text, keyword candidate set generating means for generating, as a keyword candidate, a word string corresponding to a prescribed sequence of part-of-speeches from a result of the part-of-speech analyzing, and keyword output means for outputting each keyword candidate of the keyword candidate set as a keyword.

A keyword extracting device according to a twenty-second aspect of the present invention is characterized by keyword candidate set generating means for collecting, into one, keyword candidates repeated in the keyword candidate set.

A keyword extracting device according to a twenty-third aspect of the present invention is characterized by pattern processing means for carrying out matching and replacement of a character string based on pattern in a regular expression or its equivalent and pattern storage means for storing a pattern representing a character string to be used for the matching and the replacement in the pattern processing means.

A keyword extracting device according to a twenty-fourth aspect of the present invention is characterized by pattern storage means having a non-keyword candidate pattern representing a portion which cannot be a candidate of a keyword, and non-keyword removing means for searching all character strings which are matched with a non-keyword candidate pattern and are not repeated with each other and for replacing the character string with a special character string which does not correspond to the prescribed sequence of part-of-speeches by using the pattern processing means for the text.

A keyword extracting device according to a twenty-fifth aspect of the present invention is characterized by pattern storage means having an extra keyword component pattern representing a keyword component which is hard to generate as a word string corresponding to the prescribed sequence of part-of-speeches, extra keyword component extracting means for extracting, as extra keyword components, all character strings which are matched with the extra keyword component pattern and are not overlapped with each other, recording an extracting position, and converting each character string matched in the text into a special character string which does not correspond to the prescribed sequence of part-of-speeches by using pattern processing means for the text, and keyword candidate set generating means for generating a keyword candidate set from a word string corresponding to the prescribed sequence of part-of-speeches and the extra keyword component.

A keyword extracting device according to a twenty-sixth aspect of the present invention is characterized by pattern storage means having an unnecessary word pattern representing an unnecessary word, and unnecessary word removing means for removing a character string matched with the unnecessary word pattern from a keyword candidate set by using pattern processing means for a whole character string of each keyword candidate of the keyword candidate set.

A keyword extracting device according to a twenty-seventh aspect of the present invention is characterized by pattern storage means having a necessary word pattern representing a necessary word and an unnecessary word pattern representing an unnecessary word, and unnecessary word removing means for removing a character string which is not matched with the necessary word pattern but is matched with the unnecessary word pattern from a keyword candidate set by using pattern processing means for a whole character string of each keyword candidate of the keyword candidate set.

A keyword extracting device according to a twenty-eighth aspect of the present invention is characterized by pattern storage means having an unnecessary head pattern representing an unnecessary head character string, and unnecessary head character string removing means for removing a portion matched with the unnecessary head pattern from a keyword candidate matched with the unnecessary head pattern, by using the pattern processing means for a head character string of each keyword candidate of the keyword candidate set, if this removal results in an empty character string, the original keyword candidate is deleted from a keyword candidate set. If the result of this removal is not an empty character string, the original keyword candidate is replaced by a keyword candidate in which an unnecessary head character string is removed.

A keyword extracting device according to a twenty-ninth aspect of the present invention is characterized by pattern storage means having an unnecessary head pattern representing an unnecessary head character string and a necessary head pattern representing a necessary head character string, and unnecessary head character string removing means for removing a portion matched with the unnecessary head pattern from a keyword candidate which is not matched with the necessary head pattern but is matched with the unnecessary head pattern, by using the pattern processing means for a head character string of each keyword candidate of the keyword candidate set, if this removal results in an empty character string, the original keyword candidate is deleted from a keyword candidate set. If the result of this removal is not an empty character string, the original keyword candidate is replaced by a keyword candidate in which an unnecessary head character string is removed.

A keyword extracting device according to a thirtieth aspect of the present invention is characterized by pattern storage means having an unnecessary end pattern representing an unnecessary end character string, and unnecessary end character string removing means for removing a portion matched with the unnecessary end pattern from a keyword candidate matched with the unnecessary end pattern, by using pattern processing means for an end character string of each keyword candidate of the keyword candidate set, if this removal results in an empty character string, the original keyword candidate is deleted from a keyword candidate set. If the result of this removal is not an empty character string, the original keyword candidate is replaced by a keyword candidate in which an unnecessary end character string is removed.

A keyword extracting device according to a thirty-first aspect of the present invention is characterized by pattern storage means having an unnecessary end pattern representing an unnecessary end character string and a necessary end pattern representing a necessary end character string, and unnecessary end character string removing means for removing a portion matched with the unnecessary end pattern from a keyword candidate which is not matched with the necessary end pattern but is matched with the unnecessary end pattern, by using pattern processing means for an end character string of each keyword candidate of the keyword candidate set, if this removal results in an empty character string, the original keyword candidate is deleted from a keyword candidate set. If the result of this removal is not an empty character string, the original keyword candidate is replaced by a keyword candidate in which an unnecessary end character string is removed.

A keyword extracting device according to a thirty-second aspect of the present invention is characterized in that which is finally removed from a candidate set by applying two of the unnecessary word removing means, the unnecessary head character string removing means and the unnecessary end character string removing means or more in combination or by applying either the unnecessary head character string removing means or the unnecessary end character string removing means twice or more, is added to a selection choice of the unnecessary word pattern.

A keyword extracting device according to a thirty-third aspect of the present invention is characterized by a plurality of pattern storage means corresponding to a type and field of a text, a kind of a stored pattern and the like, and pattern processing means for simultaneously applying the same kind of patterns stored in each pattern storage means when applying various patterns and for setting, as a matching result, the longest character string which is matched at the headmost position in the text.

A keyword extracting device according to a thirty-fourth aspect of the present invention is characterized by pattern processing means for simultaneously applying a pattern stored in each pattern storage means and for setting, as a matching result, a character string matched with any pattern, thereby stopping application of other patterns, in relation to an unnecessary word pattern and a necessary word pattern.

A keyword extracting device according to a thirty-fifth aspect of the present invention is characterized by a plurality of pattern storage means corresponding to a type and field of a text, a kind of a stored pattern and the like, and pattern integrating means for expanding selection, concatenation, repetition and the like in a pattern if necessary, and for integrating and outputting, for each kind of pattern, various patterns stored in the pattern storage means while aligning a component of a pattern in relation to a character string length which might be matched.

A keyword extracting device according to a thirty-sixth aspect of the present invention is characterized by pattern integrating means for providing an upper limit for a character string length which might be matched, and for integrating and outputting, for each kind of pattern, various patterns stored in the pattern storage means while removing a component of a pattern which exceeds the upper limit.

A keyword extracting device according to a thirty-seventh aspect of the present invention is characterized by pattern integrating means for providing an upper limit of the number of expansions for the repetition of patterns to exclude the repetition of a pattern which exceeds the upper limit, thereby integrating and outputting, for each kind of pattern, various patterns stored in the pattern storage means.

A keyword extracting device according to a thirty-eighth aspect of the present invention is characterized by pattern integrating means for outputting a pattern having, as a selection choice, a pattern stored in each pattern storage means, in relation to an unnecessary word pattern and a necessary word pattern.

BEST MODE FOR CARRYING OUT THE INVENTION

Embodiment 1

Figure 1:
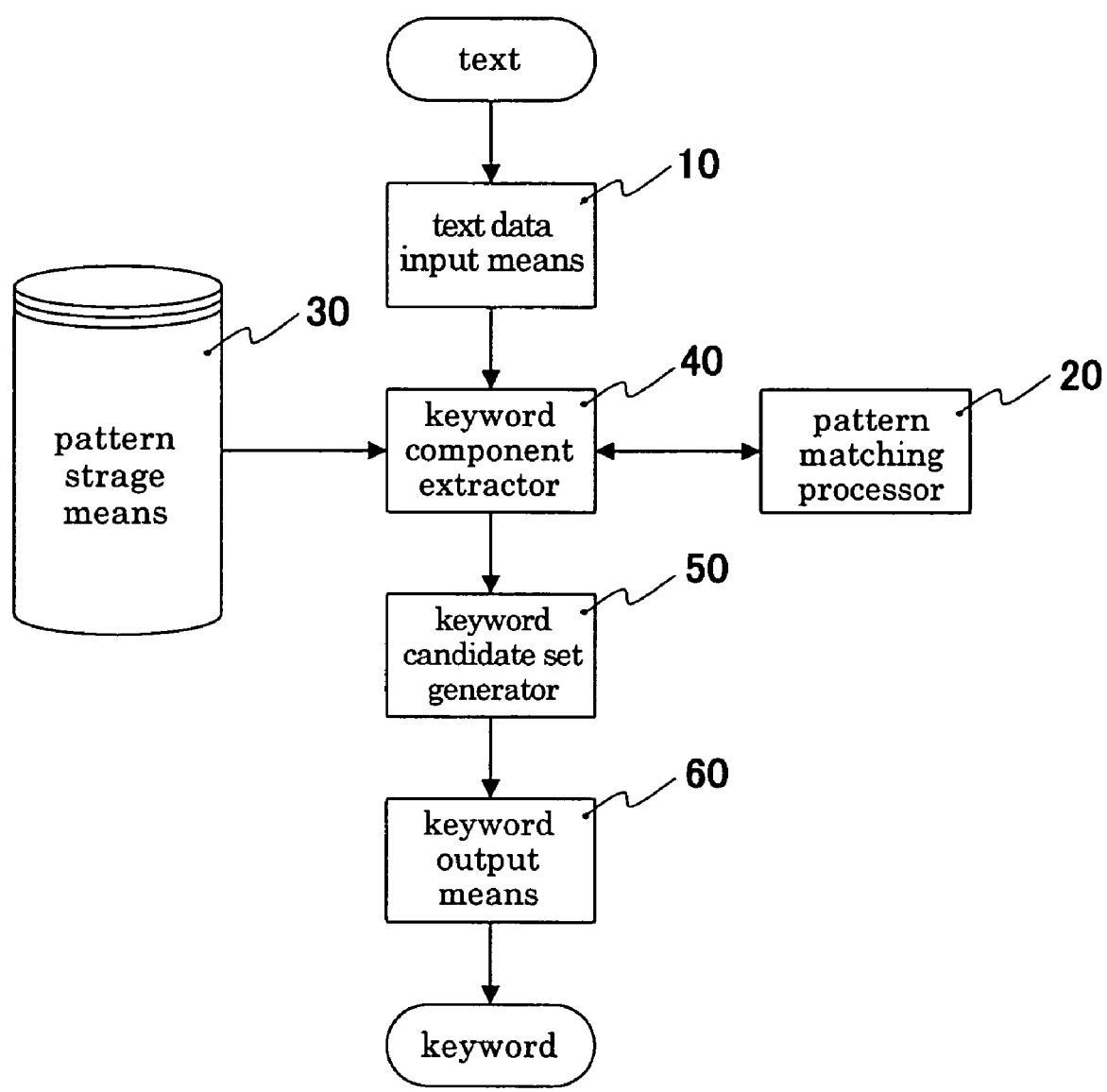
FIG. 1 is a diagram illustrating a keyword extracting device according to EMBODIMENT 1.

FIG. 1 is a diagram illustrating a keyword extracting device according to EMBODIMENT 1 for carrying out the present invention.

In FIG. 1, 10 denotes text data input means, 20 denotes pattern matching processor, 30 denotes pattern storage means, 40 denotes keyword component extractor, 50 denotes keyword candidate set generator, and 60 denotes keyword output means.

The text data input means 10 reads text data from a file stored in a hard disk drive or the like, for example. It performs conversion of a Japanese character code or the like as required.

The pattern matching processor 20 takes a character string such as a text and a pattern in regular expression or its equivalent to carry out matching, thereby outputting a matched partial character string and a position thereof and replacing the matched partial character string with another character string which is given. By applying a certain pattern again to a character string succeeding to a portion matched with the same pattern, moreover, all partial character strings matched with the pattern without overlapping each other can be searched from a certain character string and can be replaced.

The regular expression can generalize and express a part of the character strings in place of a specific character string, and is defined in the following manner, for example.

A normal character is a regular expression to be matched therewith.

Example) A regular expression of "B" is matched with "B" in a text of "ABCDE".

A concatenated regular expression is a regular expression to be matched with a character string obtained by concatenating character strings matched with each regular expression.

Example) "CD" is matched with "CD" of "ABCDE".

"^" is a regular expression to be matched with a head of a character string.

Example) "^ A" is matched with "A" of "ABCDE".

"$" is a regular expression to be matched with an end of a character string.

Example) "E$" is matched with "E" of "ABCDE".

Normal characters arranged between "[" and "]" is a regular expression to be matched with any one of them.

A character within a certain range such as "[A–Z]" can also be designated. Moreover, if "^" is put immediately after "[", a regular expression to be matched with one character other than the arranged characters is obtained.

Example) "[B–D]" is matched with any of "B", "C" and "D" of "ABCDE".

"[^ B–D]" is matched with either "A" or "E" of "ABCDE".

A regular expression enclosed by "(" and ")" is a regular expression equivalent to a regular expression in parentheses.

Example) "(CD)" is matched with "CD" of "ABCDE".

A regular expression interposing "|" is a regular expression to be matched with a character string matched with any of regular expressions provided therebefore and thereafter (selection).

Example) "(B|CD)" is matched with either "B" or "CD" of "ABCDE".

A regular expression having "{m, n}" (m and n are integers equal to or greater than 0, m≦n) provided thereafter represents a repetition for the regular expression to be carried out m times or more and n times or less.

Example) "B {1, 3}" is matched with "BB" or any "B" of "ABBDE".

Regular expressions having "{m}", "{m, }", "*", "+" and "?" provided thereafter are equivalent to the regular expressions "{m, m}", "{m, ∞}", "{0, ∞}", "{1, ∞}" and "{0, 1}" provided thereafter, respectively.

Example) "B {2}" is matched with "BB" of "ABBDE".

"B+" is equivalent to "B {1, }" and is matched with "BB" or any "B" of "ABBDE".

"B*D" is matched with any of "BBD", "BD" and "D" of "ABBDE".

"B ? D" is matched with either "BD" or "D" of "ABBDE".

The matching based on the regular expression is efficiently carried out by using a non-deterministic finite state automaton. In this case, attention should be paid to the following respects.

If a plurality of portions of a character string can be matched, a portion closer to the head of the character string is matched. (C1)

If a plurality of selection choices can be matched in the selection, a left selection choice has a priority. (C2)

In a regular expression including a repetition, the matching based on more repetitions has a priority. (C3)

The pattern storage means 30 serves to store a pattern in regular expression or its equivalent which can be processed by the pattern matching processor 20. In the following description, it is assumed that a pattern is described in the above-mentioned regular expression.

For example, in the case in which a keyword component representing the situation of an exchange rate of yen is to be extracted from a text such as information about the exchange rate of yen a keyword component pattern (1) as follows may be prepared (hereinafter, a doubled underline is employed to indicate a western word or a part of western word which is represented by one kanji character in Japanese, that is, "yen" is represented by one kanji character for example), such as $$\text{"([0–9]+[\underline{\underline{yen}} \; \underline{\underline{sen}}]|(\underline{\underline{yen}}|dollar)[\underline{\underline{rise}} \; \underline{\underline{fall}}])"} \qquad (1)$$

In the technical documents and the like, moreover, it is useful that a character string of continuous kanji or katakana is set to be a keyword component in many cases (kanji is also known as Chinese letter and two or more continuous kanji is mostly used as a noun in Japanese, katakana is one type of Japanese alphabetic character and two or more continuous katakana is mostly used as a substitution for a western word). In the case of one character of kanji, "$\underline{\underline{light}}$", "$\underline{\underline{heat}}$" or the like has the meaning depending on a field (in Japanese, a western word "light" or "heat" is represented in a single kanji character respectively). However, in many cases, hiragana succeeds to the kanji character to make a verb or an adjective (hiragana is another type of Japanese alphabetic character for domestic words). In many cases, therefore, it is preferable that the one character of kanji should be removed from the keyword component except for certain of characters. Moreover, one character of katakana should be the keyword component very rarely. In consideration of the foregoing, for example, it is considered that the following keyword component pattern (2) is used.

$$\text{"([α-ζ]\{2,\}|[£-¢~-]\{2,\}|[\underline{\underline{light}} \; \underline{\underline{heat}}])"} \qquad (2)$$

It is assumed here that the "[α-ζ]" is a pattern representing all kanji characters and "[£-¢~-]" is a pattern representing all katakana characters and prolonged sound symbols. As shown in (C2), moreover, a left selection choice has a priority in the matching. Therefore, a selection choice to be matched with a short character string such as "[$\underline{\underline{light}}$ $\underline{\underline{heat}}$]" is put on the right to match, as a whole pattern, a character string which is as long as possible.

The keyword component extractor 40 carries out the matching through the pattern matching processor 20 by using the keyword component pattern stored in the pattern storage means 30 for a text input by the text data input means 10, and extracts, as the keyword components, all character strings to be matched without overlapping each other.

For example, if the keyword component pattern (1) corresponding to the information about the exchange rate of yen is used for a following text (3), keyword components (4) are extracted.

"On 15th Tokyo foreign exchange market $\underline{\underline{yen}}$ rate, 1 dollar=106 $\underline{\underline{yen}}$ 11 $\underline{\underline{sen}}$, 1 $\underline{\underline{yen}}$ 15 $\underline{\underline{sen}}$ $\underline{\underline{yen}}$ $\underline{\underline{rise}}$ than previous day." (3)

"106 $\underline{\underline{yen}}$", "11 $\underline{\underline{sen}}$", "1 $\underline{\underline{yen}}$", "15 $\underline{\underline{sen}}$", "$\underline{\underline{yen}}$ $\underline{\underline{rise}}$" (4)

Moreover, for a text of (5), if the keyword component pattern (2) corresponding to the technical document is used, keyword components (6) are extracted (because, in Japanese, western words "communication apparatus" and "develop" are represented by four and two continuous kanji characters respectively, and a western word "device" is represented by four continuous katakana characters).

"A communication apparatus using a light device is developed." (5)

"light", "device", "communication apparatus", "develop" (6)

Since the "use" of "using" is not matched with the pattern, it does not act as the keyword component (a western word "using", which is represented by a kanji character with following two hiragana characters in Japanese, is not matched, since the pattern (2) matches with two or more continuous kanji characters except for a single kanji "light" or "heat").

The keyword candidate set generator 50 generates a set of keyword candidates from the keyword components extracted by the keyword component extractor 40.

It is the simplest that each keyword component is exactly used as a keyword candidate. This method has such an aspect that an element concept can easily be extracted but a composite keyword including some keyword components cannot be extracted.

Moreover, it is also considered that a set of keyword candidate is generated by coupling continuous keyword components on a text as one keyword candidate and by exactly using a single keyword component as a keyword candidate. In the above-mentioned example, the first two keyword components and the last three keyword components are continuous, respectively. Therefore, a set of keyword candidate (7) is generated.

"106 yen 11 sen", "1 yen 15 sen yen rise" (7)

This method has such an aspect that a composite keyword can be extracted easily but an element concept is taken out with difficulty.

Furthermore, it is also possible to suppose such a method that each of continuous keyword components on a text is used as a single keyword candidate and adjacent keyword components coupled together are used as keyword candidates respectively, while a single keyword component is exactly used as a keyword candidate to generate a set of keyword candidates respectively. In this case, according to the above-mentioned example, a set of keyword candidates (8) is generated.

"106 yen", "11 sen", "1 yen", "15 sen", "yen rise",
"106 yen 11 sen", "1 yen 15 sen", "15 sen yen
rise", "1 yen 15 sen yen rise" (8)

The set of keyword candidates obtained by this method includes the last candidates obtained by above-mentioned two methods, and an element concept and a composite keyword can also be extracted. In some cases, however, an incomplete composite keyword is extracted.

A decision whether or not the keyword components are continuous on a text is implemented in the following manner, for example. In the keyword component extractor 40, first of all, a keyword component is extracted and an extracting position is recorded as a character number from the head of a text. For example, if it is assumed that a keyword component E1 having a character string length L1 is extracted in a position P1 and a keyword component E2 is then extracted in a position P2, it is decided that E1 and E2 are continuous on the text if P1+L1 is equal to P2.

In order to avoid redundancy in a subsequent processing, moreover, the keyword candidate set generator 50 may collect the overlapped keyword candidates into one.

The keyword output means 60 serves to output each keyword candidate of a keyword candidate set as a keyword to a file, a printer, a display and the like.

According to EMBODIMENT 1, thus, a keyword component is extracted by using a pattern in regular expression or its equivalent having a high descriptive property. Therefore, it is possible to easily implement flexible keyword extraction which is not peculiar to character species.

Embodiment 2

Figure 2:
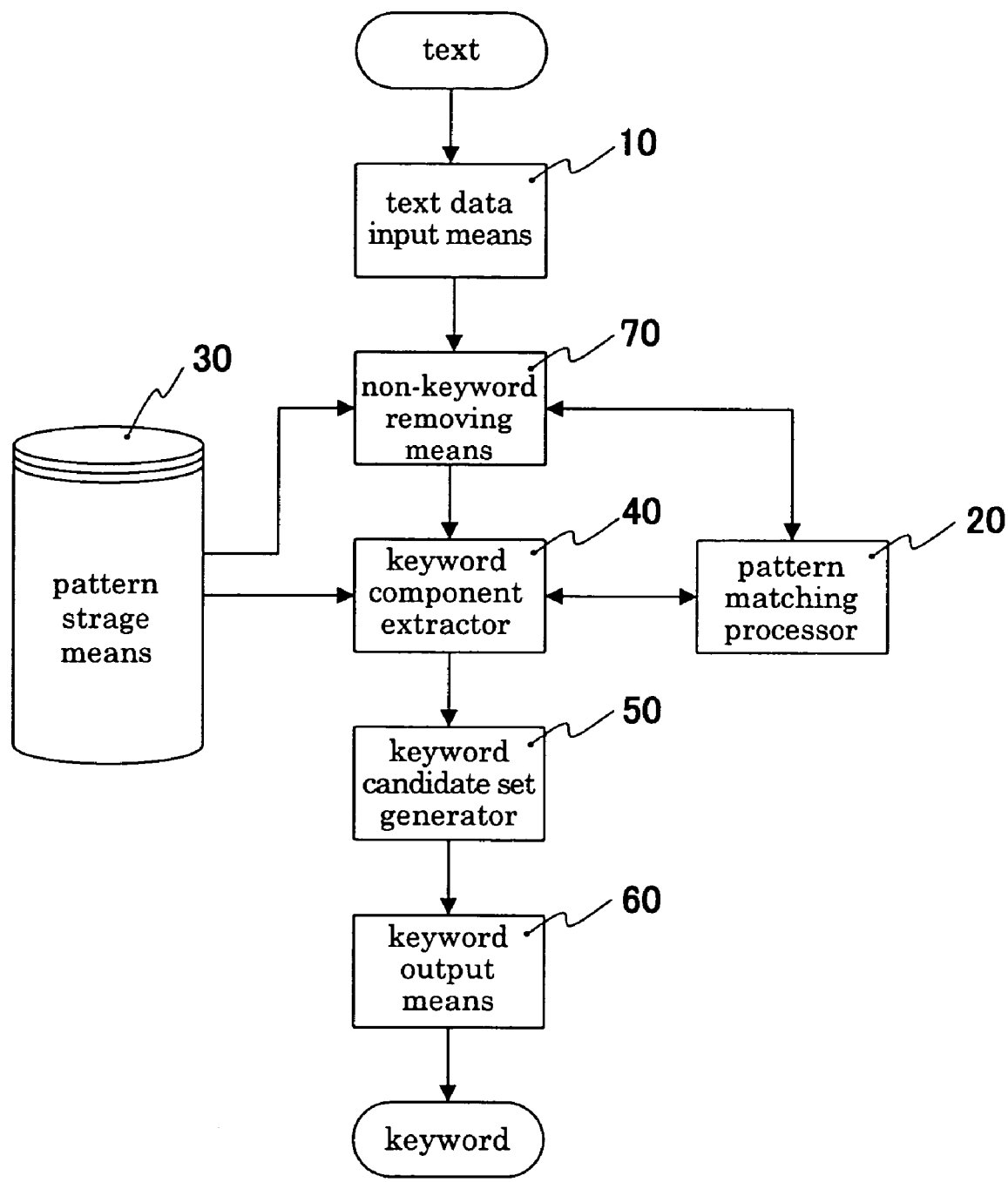
FIG. 2 is a diagram illustrating a keyword extracting device according to EMBODIMENT 2.

FIG. 2 is a diagram illustrating a keyword extracting device according to EMBODIMENT 2 for carrying out the present invention.

In FIG. 2, the same reference numerals as those in FIG. 1 denote the same or corresponding portions.

In FIG. 2, 70 denotes non-keyword removing means. Moreover, pattern storage means 30 additionally stores a non-keyword candidate pattern representing a portion which cannot be a keyword candidate.

For example, in the case in which only the trend of the exchange rate of yen is to be taken as a keyword out of information about the exchange rate of yen irrespective of the current exchange rate of yen, a following pattern (9) may be stored as a non-keyword candidate pattern.

"1 dollar=[0–9]+yen([0–9]+sen)?" (9)

By using pattern matching processor 20, the non-keyword removing means 70 searches, from a text, all character strings which are matched with a non-keyword candidate pattern stored in the pattern storage means 30 and are not overlapped (not having the same portion) with each other and replaces the character string with a special character string with which any pattern is never matched.

For example, if any pattern is never matched with a character string including a half-size character, a character string matched with a non-keyword candidate pattern is replaced with a character string of "### . . . " having the same number of half-size characters (". . . " is an ellipsis of a repetition). The above-mentioned example (3) of the information about the exchange rate of yen is converted into a following text (10).

"On 15th Tokyo foreign exchange market yen rate,
##########, 1 yen 15 sen yen rise
than previous day ." (10)

The keyword component extractor 40 extracts a keyword component from a text converted by the non-keyword removing means 70. In the example of the information about the exchange rate of yen, a following keyword component (11) is extracted by using the keyword component pattern (1) corresponding to the above-mentioned information about the exchange rate of yen for the above-mentioned text (10), for example, "1 yen", "15 sen", "yen rise" (11)

According to EMBODIMENT 2, thus, a portion which cannot be a keyword candidate is previously removed to extract a keyword component. Therefore, it is possible to prevent an unnecessary keyword component from being extracted.

Embodiment 3

Figure 3:
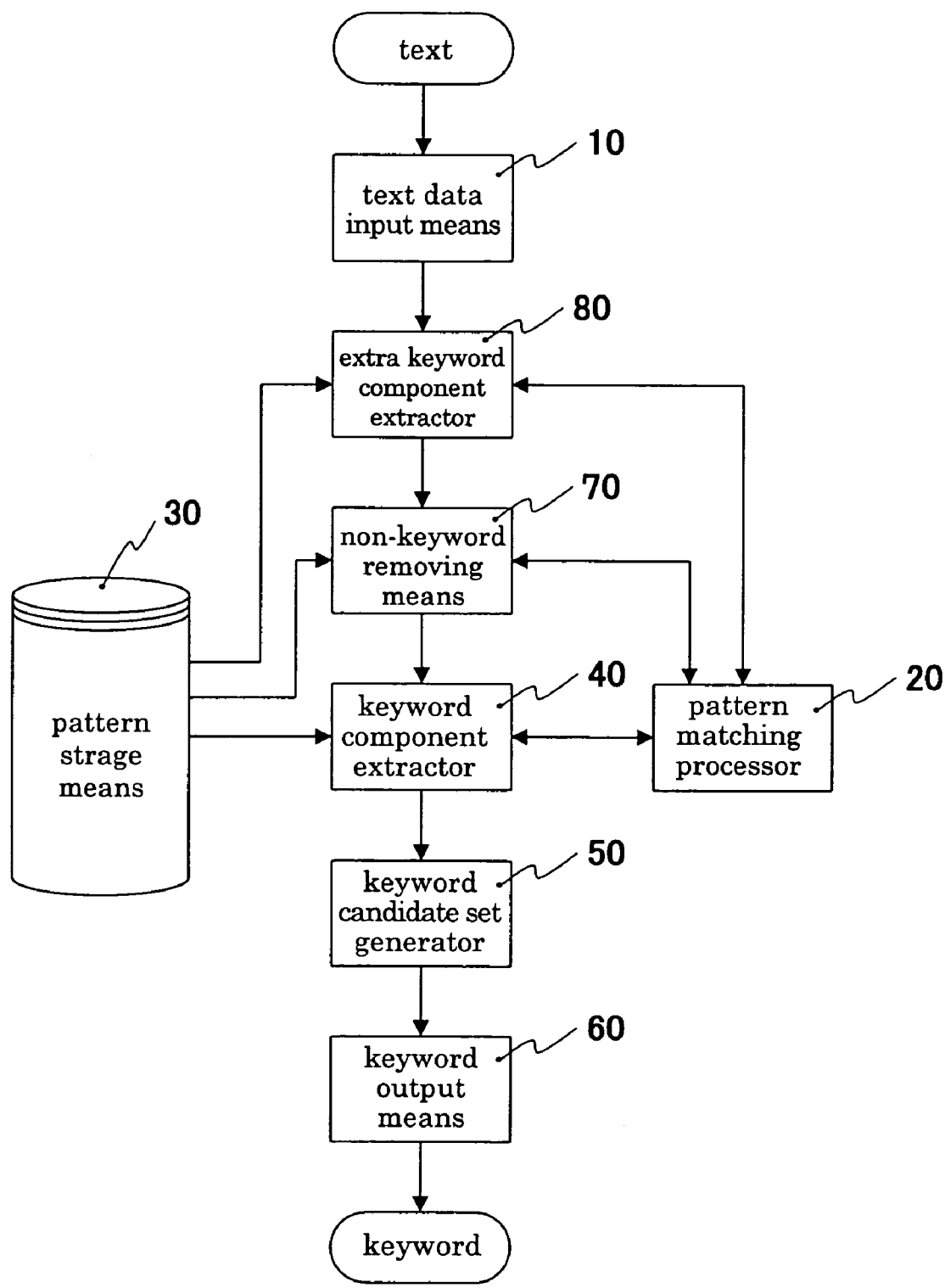
FIG. 3 is a diagram illustrating a keyword extracting device according to EMBODIMENT 3.

FIG. 3 is a diagram illustrating a keyword extracting device according to EMBODIMENT 3 for carrying out the present invention.

In FIG. 3, the same reference numerals as those in FIGS. 1 and 2 denote the same or corresponding portions.

In FIG. 3, 80 denotes extra keyword component extractor. Moreover, pattern storage means 30 additionally stores an extra keyword component pattern representing a keyword component which is hard to cover with the keyword component pattern.

In the case of the technical document, for example, it is supposed that a pattern for extracting a keyword component having hiragana mixed therein which cannot be covered with the keyword component pattern (2) is prepared.

Moreover, if numeric data which often appear in the technical document are set to a non-keyword candidate pattern (12) such as shown below, the non-keyword removing means 70 can remove them.

"[0–9.-]+"  (12)

In such a case, however, a keyword component including a numeric character cannot be extracted by keyword component extractor 40.

In order to extract these keyword components, for example, an extra keyword component pattern (13) such as shown below is prepared.

"(threshold|interrupt|[0–9]+(number system|dimensionally))"  (13)

(It should be noted here that Japanese representations of western words "threshold" and "interrupt" include both kanji and hiragana characters, while Japanese representations of western words "number system" and "dimensionally" comprise only kanji characters respectively.)

By using pattern matching processor 20, the extra keyword component extractor 80 extracts, as extra keyword components, all character strings which are matched with an extra keyword component pattern stored in the pattern storage means 30 and are not overlapped with each other, records an extracting position thereof, and replaces the character string with a special character string with which any pattern is never matched. For example, if any pattern is never matched with a character string including a half-size character, the extracted character string is replaced with a character string of "@@@ . . . " having the same number of half-size characters.

For example, if the extra keyword component pattern (13) is used for a following text (14), an extra keyword component (15) is extracted and an original text is converted into a text (16) and a subsequent processing is carried out.

"Light receiving elements are 2 dimensionally arranged."  (14)

"2 dimensionally"  (15)

"Light receiving elements are @@@@@@@@@@@@@@ arranged."  (16)

Keyword candidate set generator 50 generates a keyword candidate from an extra keyword component extracted by the extra keyword component extractor 80 and a keyword component extracted by the keyword component extractor 40.

If the keyword component pattern (2) is used for the above-mentioned example (14), two keyword components (17) are extracted (because "Light receiving elements" and "arrange" are represented by four and two continuous kanji characters respectively). Thereafter, a keyword candidate is generated by any of the methods according to EMBODIMENT 1, for example, from the two keyword components (17) and the extra keyword component (15).

"Light receiving elements", "arrange"  (17)

Referring to a continuity decision on a text of the extra keyword component and the keyword component in the keyword candidate set generator 50, for example, the method according to EMBODIMENT 1 can be used by carrying out no change in the number of characters of the text as described above in the replacement of the text in the extra keyword component extractor 80 or the non-keyword removing means 70, for example.

According to EMBODIMENT 3, thus, it is possible to previously extract a keyword component which is hard to cover with a keyword component pattern or cannot be extracted with removal of a non-keyword candidate.

Embodiment 4

Figure 4:
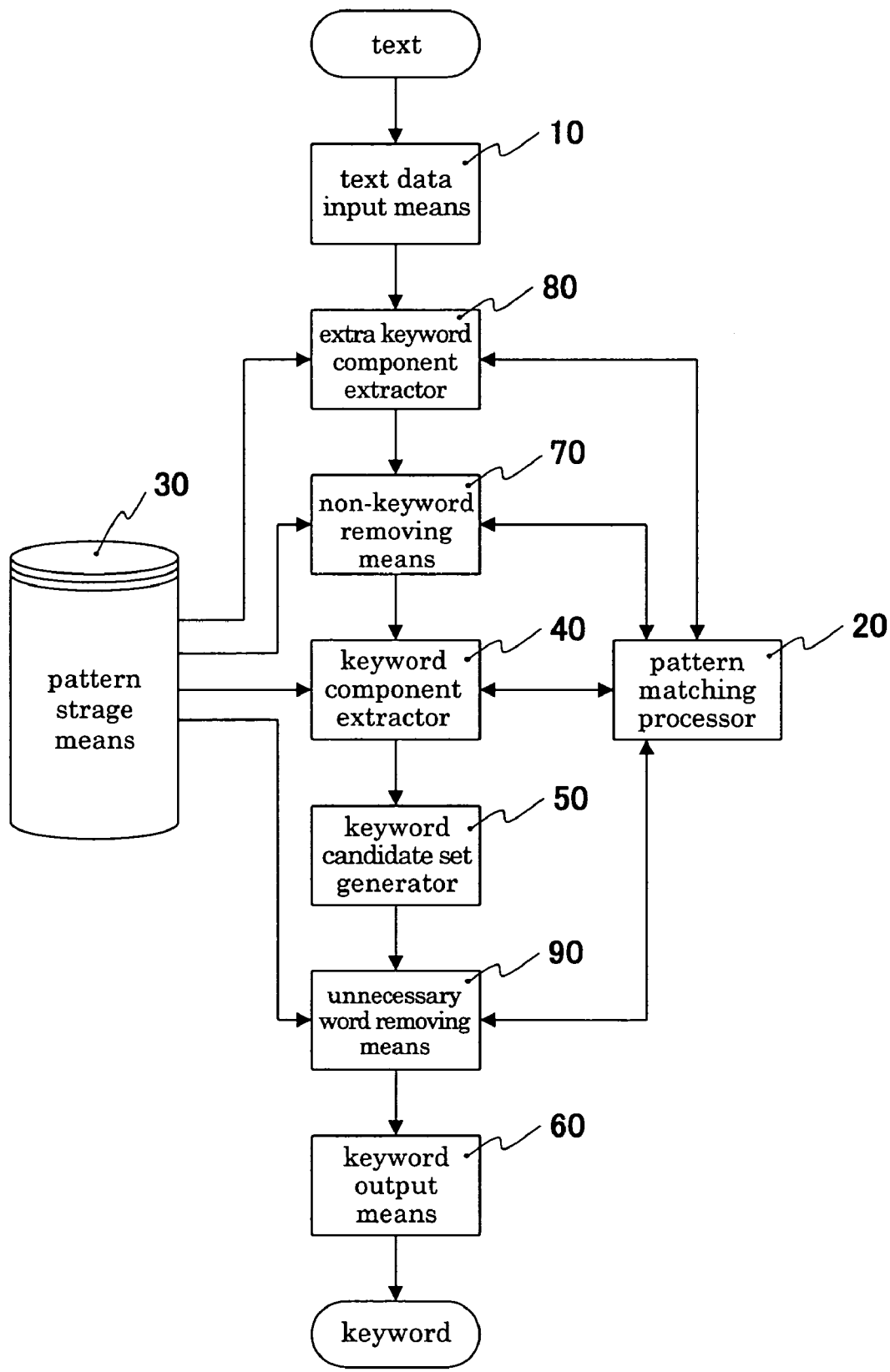
FIG. 4 is a diagram illustrating a keyword extracting device according to EMBODIMENT 4.

FIG. 4 is a diagram illustrating a keyword extracting device according to EMBODIMENT 4 for carrying out the present invention.

In FIG. 4, the same reference numerals as those in FIGS. 1 to 3 denote the same or corresponding portions.

In FIG. 4, 90 denotes unnecessary word removing means. Moreover, pattern storage means 30 additionally stores an unnecessary word pattern representing an unnecessary word.

In the technical document, for example, a general word such as "develop" or "utilize" and a reference to a chart and the like such as "same figure", "next chart" or "previous line" do not always represent functional features of things, ideas and the like which are described in the document and should not be keywords in many cases.

In order to cause such things to be unnecessary words, for example, the following unnecessary word pattern (18) is prepared.

"^([same present next previous following][figure chart equation line page]|develop|utilize| . . . )$"  (18)

The unnecessary word removing means 90 uses pattern matching processor 20 for each keyword candidate generated by the keyword candidate set generator 50, thereby removing, from a keyword candidate set, a keyword candidate having a whole character string matched with an unnecessary word pattern. The "^" and "$" on the head and end of the pattern (18) represent that matching with the whole character string of each keyword candidate is carried out.

For example, the keyword component of (6) exactly acts as a keyword candidate by the keyword candidate set generator 50 and the unnecessary word removing means 90 uses an unnecessary word pattern of (18), the "develop" is removed as an unnecessary word and following three words (19) remain as keyword candidates.

"light", "device", "communication apparatus"  (19)

Moreover, a necessary word pattern representing a necessary word is additionally stored in the pattern storage means 30 and the unnecessary word removing means 90 uses the pattern matching processor 20 for each keyword candidate, thereby removing, from a keyword candidate set, a keyword candidate having a whole character string which is not matched with the necessary word pattern and is matched with the unnecessary word pattern. Consequently, it is possible to prevent a necessary keyword candidate from being deleted with an unnecessary word pattern by mistake.

If "same line" should be a keyword as a verb but is matched with the unnecessary word pattern of (18), the use of following a necessary word pattern (20) causes "same line" to remain as a keyword candidate (two continuous kanji corresponding to "same line" occasionally represents a verb "go together" with following hiragana).

"^(same line| . . . )$" (20)

According to EMBODIMENT 4, thus, it is possible to use a pattern having a high descriptive property in order to remove an unnecessary keyword candidate. Moreover, the preparation of the necessary word pattern can prevent a keyword candidate from being deleted with an unnecessary word pattern by mistake.

Embodiment 5

Figure 5:
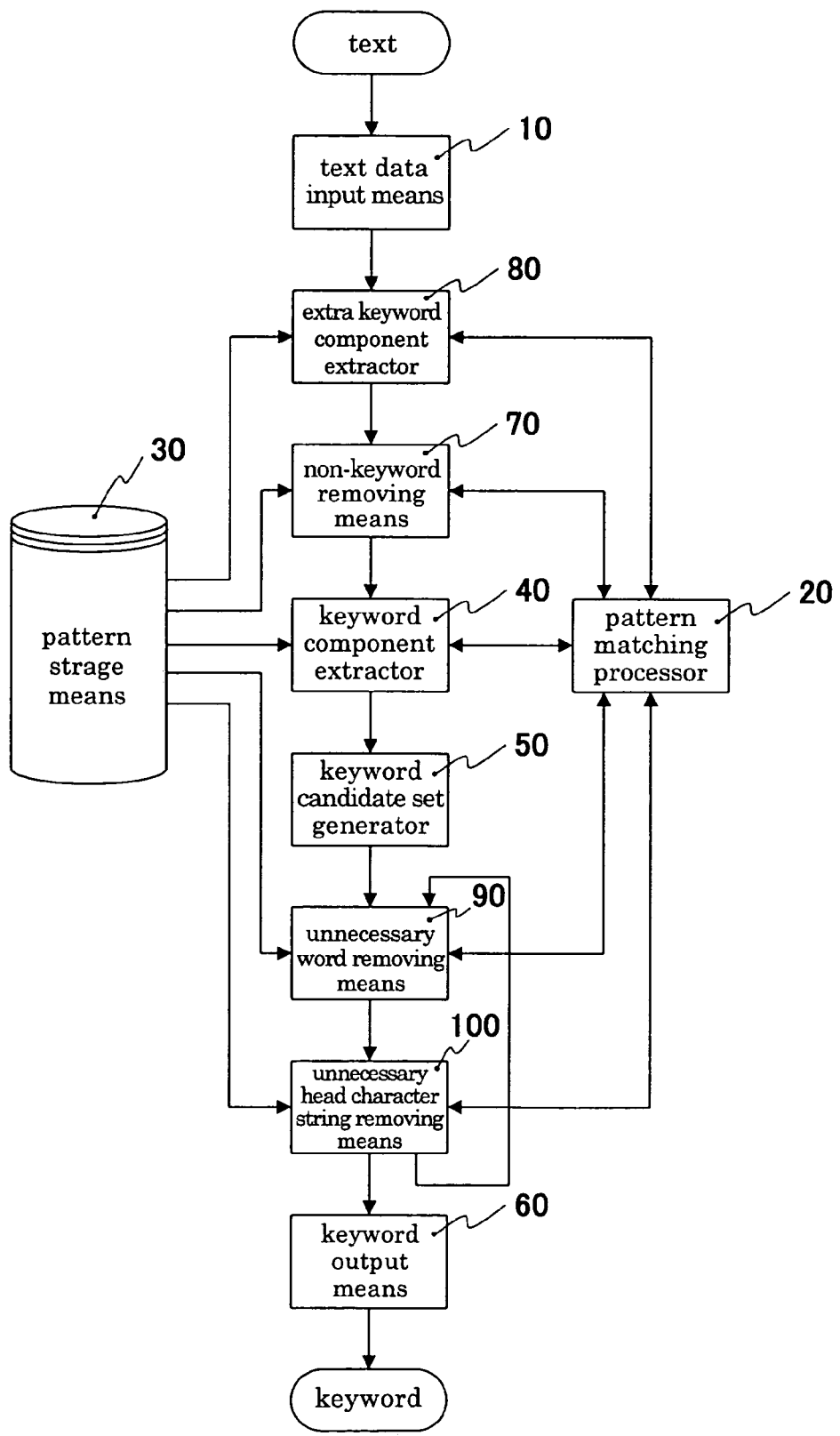
FIG. 5 is a diagram illustrating a keyword extracting device according to EMBODIMENT 5.

FIG. 5 is a diagram illustrating a keyword extracting device according to EMBODIMENT 5 for carrying out the present invention.

In FIG. 5, the same reference numerals as those in FIGS. 1 to 4 denote the same or corresponding portions.

In FIG. 5, 100 denotes unnecessary head character string removing means. Moreover, pattern storage means 30 additionally stores an unnecessary head pattern representing an unnecessary head character string. The unnecessary head character string indicates a partial character string which is unnecessary for a head character string of a keyword candidate as well as a so-called prefix which is unnecessary, for example, "each" or "approximate".

For example, in the case in which the keyword component pattern (2) is to be used in the keyword component extractor 40 for following text (21), a keyword component of "oscillate when" is extracted therefrom (in Japanese, "when" is represented by a single kanji character and positioned immediately before "oscillate" which is represented by two continuous kanji characters).

". . . oscillate when voltage are applied." (21)

In the case in which the "oscillate when" is a keyword candidate as it is, a character string of "when" is considered to be an unnecessary head character string so that only "oscillate" can be caused to remain as a keyword candidate (since "oscillate" and "when" inverts their order in Japanese, "when" is apparently an unnecessary head character string). Furthermore, in the case in which an adverbial phrase comprising kanji such as "actually", "practically" or the like is to be treated as an unnecessary head character string, for example, the following unnecessary head pattern (22) is supposed.

"^((practical|actual|real| . . . )ly|[each approximate when . . . ])" (22).

The unnecessary head character string removing means 100 uses pattern matching processor 20 for the head character string of each keyword candidate which is not removed by unnecessary word removing means 90, thereby removing a matched portion in a keyword candidate matched with an unnecessary head pattern. If this removal results in an empty character string, the original keyword candidate is deleted from a keyword candidate set. If the result of this removal is not an empty character string, the original keyword candidate is replaced by a keyword candidate in which an unnecessary head character string is removed. The keyword candidate thus replaced is turned to the unnecessary word removing means 90, and the unnecessary word removing processing and the unnecessary head character string removing processing are carried out again. "^" on the head of the pattern (22) represents that matching with the head character string of each keyword candidate is carried out.

Moreover, a necessary head pattern representing a necessary head character string is additionally stored in the pattern storage means 30 and the unnecessary head character string removing means 100 uses the pattern matching processor 20 for the head character string of each keyword candidate, thereby removing a portion matched with an unnecessary head pattern for a keyword candidate which is not matched with a necessary head pattern but is matched with the unnecessary head pattern. If this removal results in an empty character string, the original keyword candidate is deleted from a keyword candidate set. If the result of this removal is not an empty character string, the original keyword candidate is replaced by a keyword candidate in which an unnecessary head character string is removed. Consequently, it is possible to prevent a necessary head character string from being removed by mistake.

For example, in order to prevent only "approximate" in a keyword candidate such as "divisor" or "reduction of a fraction" from being removed by mistake with the unnecessary head pattern (22), a following necessary head pattern (23) of may be prepared (in Japanese, western words "divisor" and "reduction of a fraction" are represented by two continuous kanji characters respectively, and headmost kanji character thereof is same as that represents a western word "approximate").

"^(devisor|reduction of a fraction| . . . )" (23)

According to EMBODIMENT 5, thus, it is possible to use a pattern having a high descriptive property to remove an unnecessary head character string in a keyword candidate. Moreover, the preparation of the necessary head pattern can prevent the necessary head character string of the keyword candidate from being deleted with an unnecessary head pattern by mistake.

Embodiment 6

Figure 6:
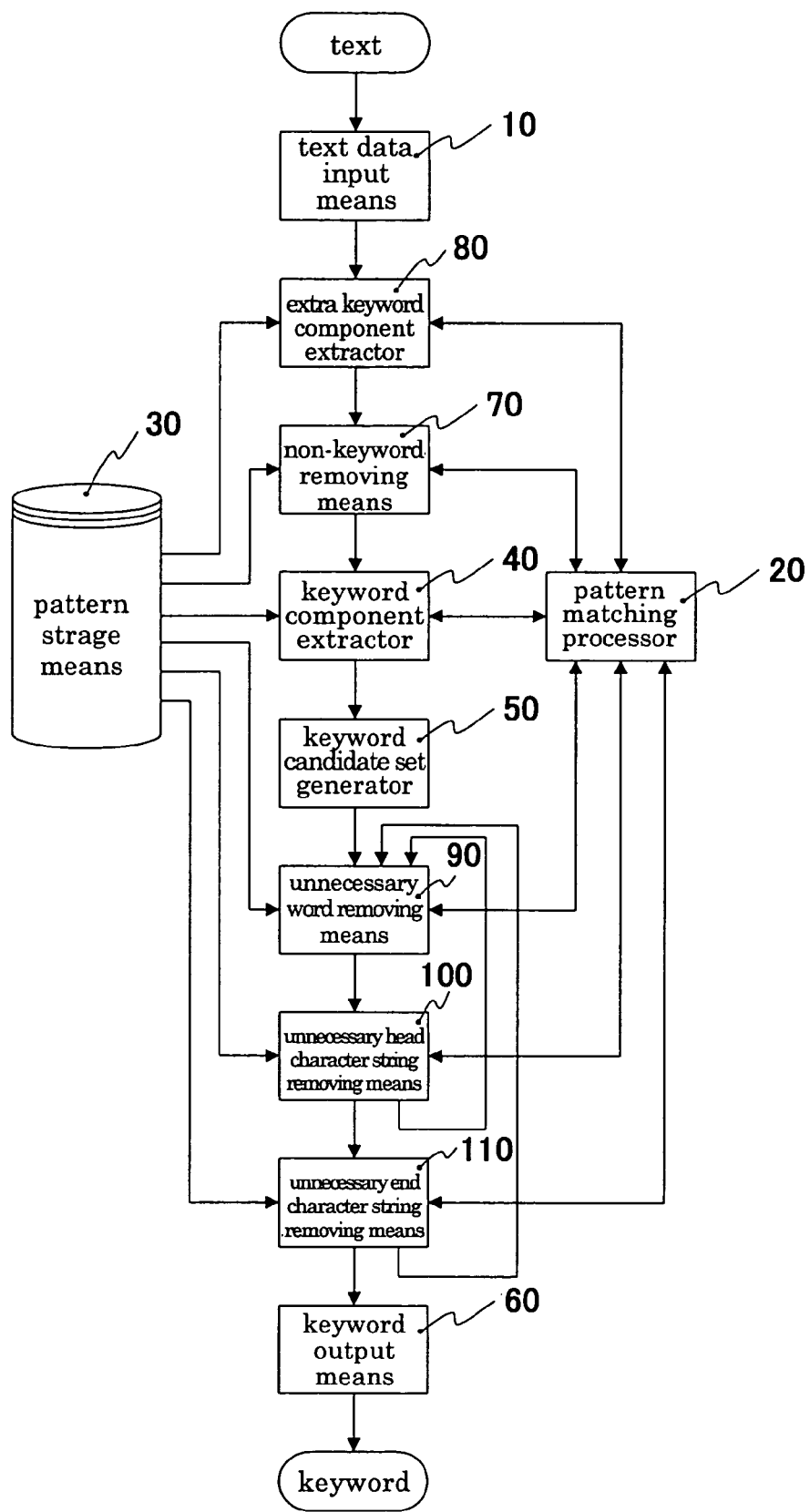
FIG. 6 is a diagram illustrating a keyword extracting device according to EMBODIMENT 6.

FIG. 6 is a diagram illustrating a keyword extracting device according to EMBODIMENT 6 for carrying out the present invention.

In FIG. 6, the same reference numerals as those in FIGS. 1 to 5 denote the same or corresponding portions.

In FIG. 6, 110 denotes unnecessary end character string removing means. Moreover, pattern storage means 30 additionally stores an unnecessary end pattern representing an unnecessary end character string. The unnecessary end character string indicates a partial character string which is unnecessary for an end character string of a keyword candidate as well as a so-called unnecessary suffix such as "such" or "group".

For example, in the case in which the keyword component pattern (2) is used in keyword component extractor 40 is used for a following text (24), a keyword component of "parallel computers especially" is extracted (it should be noted here that, in Japanese, a western word "parallel computers" is represented by five continuous kanji characters, a western word "especially" is represented by a kanji character with following a hiragana character and " especially" is positioned immediately after "parallel computers").

"parallel computers having a common memory especially . . . " (24)

In the case in which the keyword component exactly becomes a keyword candidate, a character string of "

especially" is considered as an unnecessary end character string so that only "parallel computers" can be caused to remain as the keyword candidate. In addition, in the case in which a general noun comprising kanji such as "apparatus" or "means", in particular, an unnecessary portion for the description of the function or the like is also treated as the unnecessary end character string, for example, the following unnecessary end pattern (25) can be supposed.

"(apparatus|means|[such group especial . . . ])$ " (25)

The unnecessary end character string removing means 110 uses pattern matching processor 20 for the end character string of each keyword candidate which is not removed by the unnecessary word removing means 90 and is not changed by the unnecessary head character string removing means 100, thereby removing a matched portion in a keyword candidate matched with an unnecessary end pattern. If this removal results in an empty character string, the original keyword candidate is deleted from a keyword candidate set. If the result of this removal is not an empty character string, the original keyword candidate is replaced by a keyword candidate in which an unnecessary head character string is removed. The keyword candidate thus replaced is returned to the unnecessary word removing means 90, and the unnecessary word removing processing, the unnecessary head character string removing processing and the unnecessary end character string removing processing are carried out again. "$" on the end of (25) represents that matching with the end character string of each keyword candidate is carried out.

Moreover, a necessary end pattern representing a necessary end character string is additionally stored in the pattern storage means 30 and the unnecessary end character string removing means 110 uses the pattern matching processor 20 for the end character string of each keyword candidate, thereby removing a portion matched with an unnecessary end pattern in a keyword candidate which is not matched with a necessary end pattern but is matched with the unnecessary end pattern. If this removal results in an empty character string, the original keyword candidate is deleted from a keyword candidate set. If the result of this removal is not an empty character string, the original keyword candidate is replaced by a keyword candidate in which an unnecessary head character string is removed. Consequently, it is possible to prevent a necessary end character string from being removed by mistake.

For example, in order to prevent only "group" in a keyword candidate such as "***** diseases group (syndrome)" from being removed by mistake with the unnecessary end pattern (25), for example, a following necessary end pattern (26) may be prepared.

"(diseases group| . . . )$" (26)

According to EMBODIMENT 6, thus, it is possible to use a pattern having a high descriptive property to remove an unnecessary end character string in a keyword candidate. Moreover, the preparation of the necessary end pattern can prevent the end character string of the keyword candidate from being deleted with an unnecessary end pattern by mistake.

In EMBODIMENT 5 or 6, two of the unnecessary word removing processing, the unnecessary head character string removing processing and the unnecessary end character string removing processing or more are applied in combination or either the unnecessary head character string removing processing or the unnecessary end character string removing processing is applied twice or more for a certain keyword candidate so that the certain keyword candidate is finally removed from a keyword candidate set in some cases. In the case in which a phrase including such a character string appears plural time in one document, it is possible to omit a redundant processing by adding such a character string to the selection choice of an unnecessary word pattern.

In order to implement the foregoing, for example, a character string obtained when each keyword candidate is generated by the keyword candidate set generator 50 is given as an initial character string to each keyword candidate. Then, when the keyword candidate is finally removed in any of the unnecessary word removing processing, the unnecessary head character string removing processing and the unnecessary end character string removing processing, the initial character string is added to the selection choice of the unnecessary word pattern if a last character string to be removed is different from the initial character string.

For example, it is assumed that the unnecessary end pattern (25) is first applied to a keyword candidate of "utilize means" to cause "utilize" to remain, and the unnecessary word pattern (18) is then applied and thus the keyword candidate of "utilize means" is finally removed from the keyword candidate set.

At this time, if the "utilize means" is added to the selection choice of the unnecessary word pattern, the unnecessary head pattern (22) is then applied to a keyword candidate of "each utilize means" so that the "utilize means" remains. Thereafter, a new unnecessary word pattern is applied so that the "utilize means" itself is matched and is removed as an unnecessary word. Thus, it is possible to avoid redundant processing.

Embodiment 7

Figure 7:
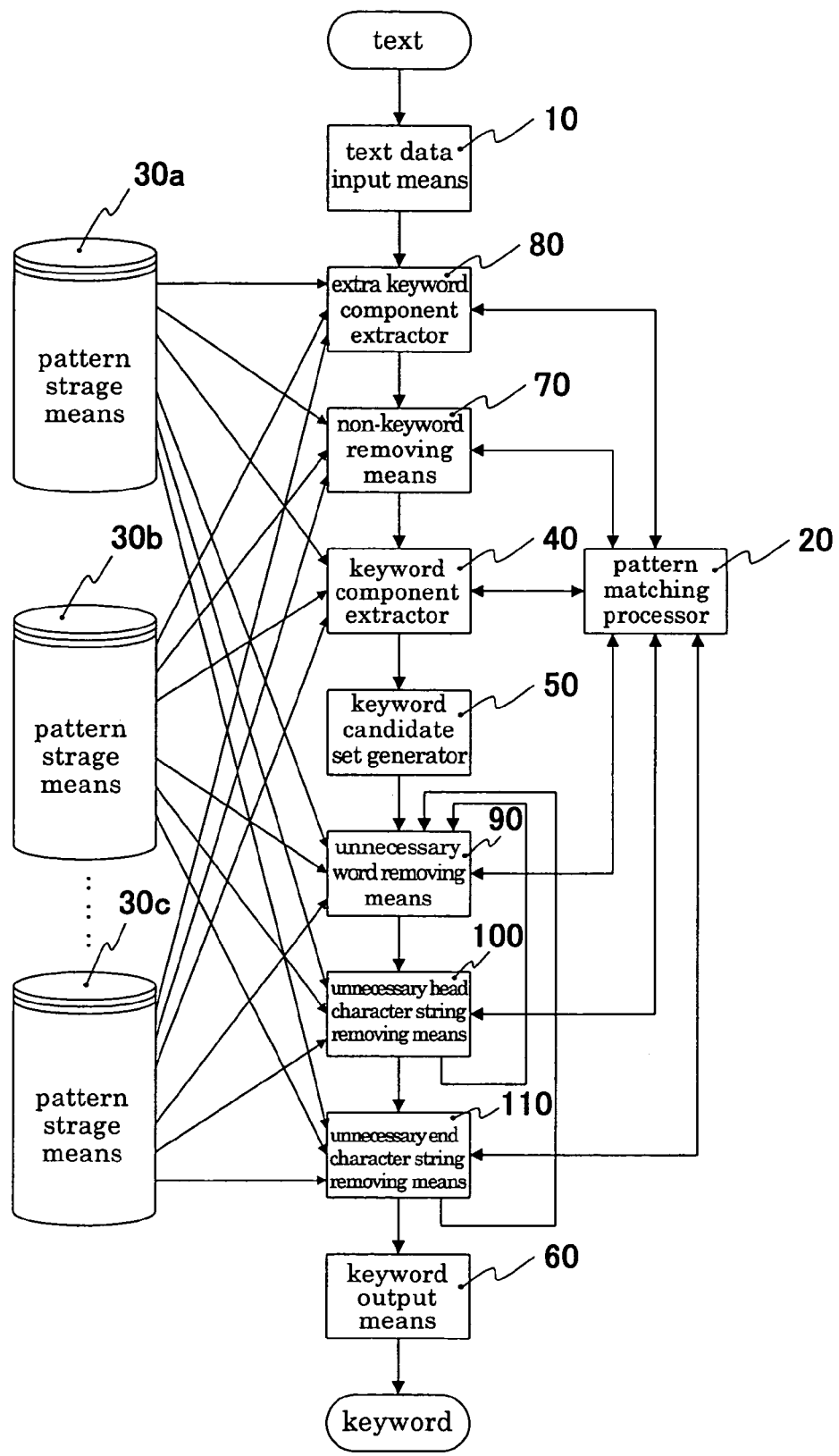
FIG. 7 is a diagram illustrating a keyword extracting device according to EMBODIMENT 7.

FIG. 7 is a diagram illustrating a keyword extracting device according to EMBODIMENT 7 for carrying out the present invention.

In FIG. 7, the same reference numerals as those in FIGS. 1 to 6 denote the same or corresponding portions.

In FIG. 7, 30a to 30c denote a plurality of pattern storage means corresponding to the type and field of a text, the kind of a stored pattern and the like.

Each pattern storage means may not always have the same kind of patterns.

For example, in the case in which keyword extraction is to be carried out for a text related to a mobile computer, information about the keyword extraction include various levels which are universal for general technical documents, can be generally utilized for computers and are peculiar to a mobile computer. For a text related to the same mobile computer, moreover, a word such as "invention" or "claim" does not represent the features of the text in the patent, for example, and is not therefore suitable for a keyword. Thus, information corresponding to the type of the text can also be supposed.

Figure 8:
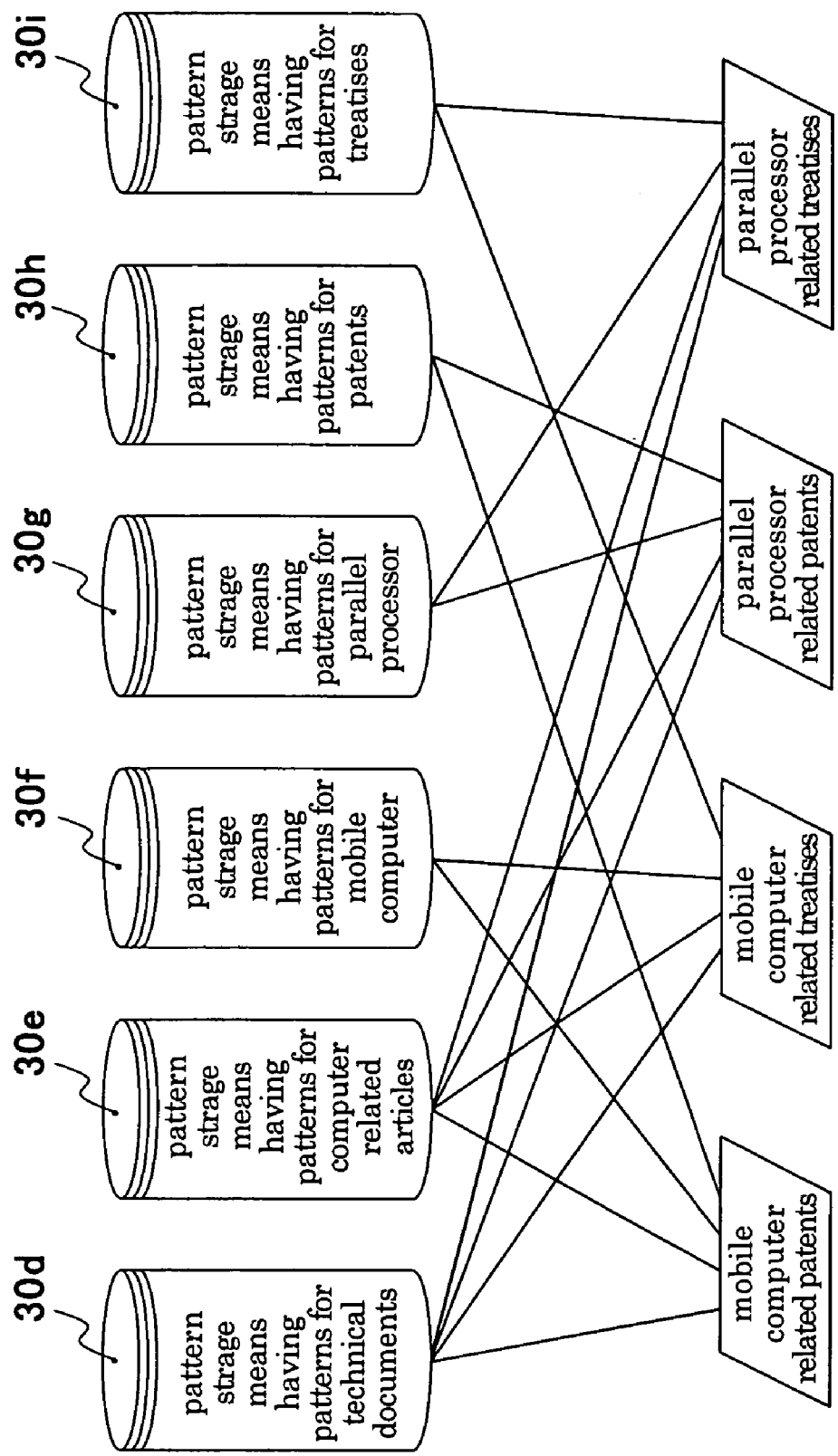
FIG. 8 is a diagram illustrating a combination of pattern storage means according to EMBODIMENT 7.

As shown in FIG. 8, if various pattern storage means for storing a pattern corresponding to information about various levels and types related to such keyword extraction are prepared and can be combined for utilization depending on the type, field or the like of the text to be intended, the keyword extraction can efficiently be implemented corresponding to various texts.

When applying various patterns, pattern matching processor 20 applies the same kind of patterns stored in each pattern storage means at the same time and sets, as a matching result, a character string having the greatest length which is matched at the headmost position in the text. If any matching is not carried out, it is supposed that the matching wholly results in failure.

Keyword component extractor 40, non-keyword removing means 70, extra keyword component extractor 80, unnecessary word removing means 90, unnecessary head character string removing means 100 and unnecessary end character string removing means 110 take a pattern necessary in each processing out of all the pattern storage means, and cause the pattern matching processor 20 to process the pattern.

For example, in the case in which following patterns (27a), (27b), (27c) are stored as extra keyword component patterns in the pattern storage means 30a, 30b and 30c respectively, "[0–9] (order)" (27a)

"[0–9] (order dimension)" (27b)

"(writing|reading)" (27c)

(27a) is matched with "3 order", (27b) is matched with "3 order dimension" and (27c) is matched with "writing" in following text (28).

"in form of 3 order dimensional data, writing is performed." (28)

Since the pattern matching processor 20 sets a character string having the greatest length which is matched on the head as a whole matching result, the "3 order dimension" is first set to be the matching result. Subsequently, when the matching is carried out for the residual "data, writing is performed.", only (27c) is matched with the "writing". Therefore, the "writing" is set to be the matching result. Nothing is matched with the residual "is performed". As a result, the extra keyword component extractor 80 extracts following strings (29) as extra keyword components.

"3 order dimension", "writing" (29)

In the case in which a keyword candidate that should be decided to be unnecessary through an unnecessary word pattern stored in certain pattern storage means is to be a keyword in a certain text, it is supposed that the use of the pattern storage means is discontinued or an unnecessary word pattern thereof is modified. It is also supposed that a pattern storage means for storing a necessary word pattern matched with the keyword candidate is used together. Referring to an unnecessary head pattern and an unnecessary end pattern, similarly, it is possible to prevent a necessary head/end character string from being deleted with a combination of a necessary head pattern and a necessary end pattern. Moreover, it is possible to extract a necessary keyword component included in a portion originally deleted by a certain non-keyword candidate pattern by using pattern storage means storing an extra keyword component pattern matched therewith together.

Referring to an unnecessary word pattern and a necessary word pattern, furthermore, the matching is carried out for the whole character string of a keyword candidate. Therefore, if the matching can be carried out in any pattern, the matching results of other patterns are not necessary. Therefore, the pattern matching processor 20 may stop their application and may return the matching result to avoid redundant pattern processing.

According to EMBODIMENT 7, thus, various pattern storage means are combined for use corresponding to the type and field of a text, the kind of a stored pattern and the like. Consequently, it is possible to enhance the reusability of information to be used for keyword extraction and to cause the information to correspond to various texts flexibly and efficiently.

Embodiment 8

Figure 9:
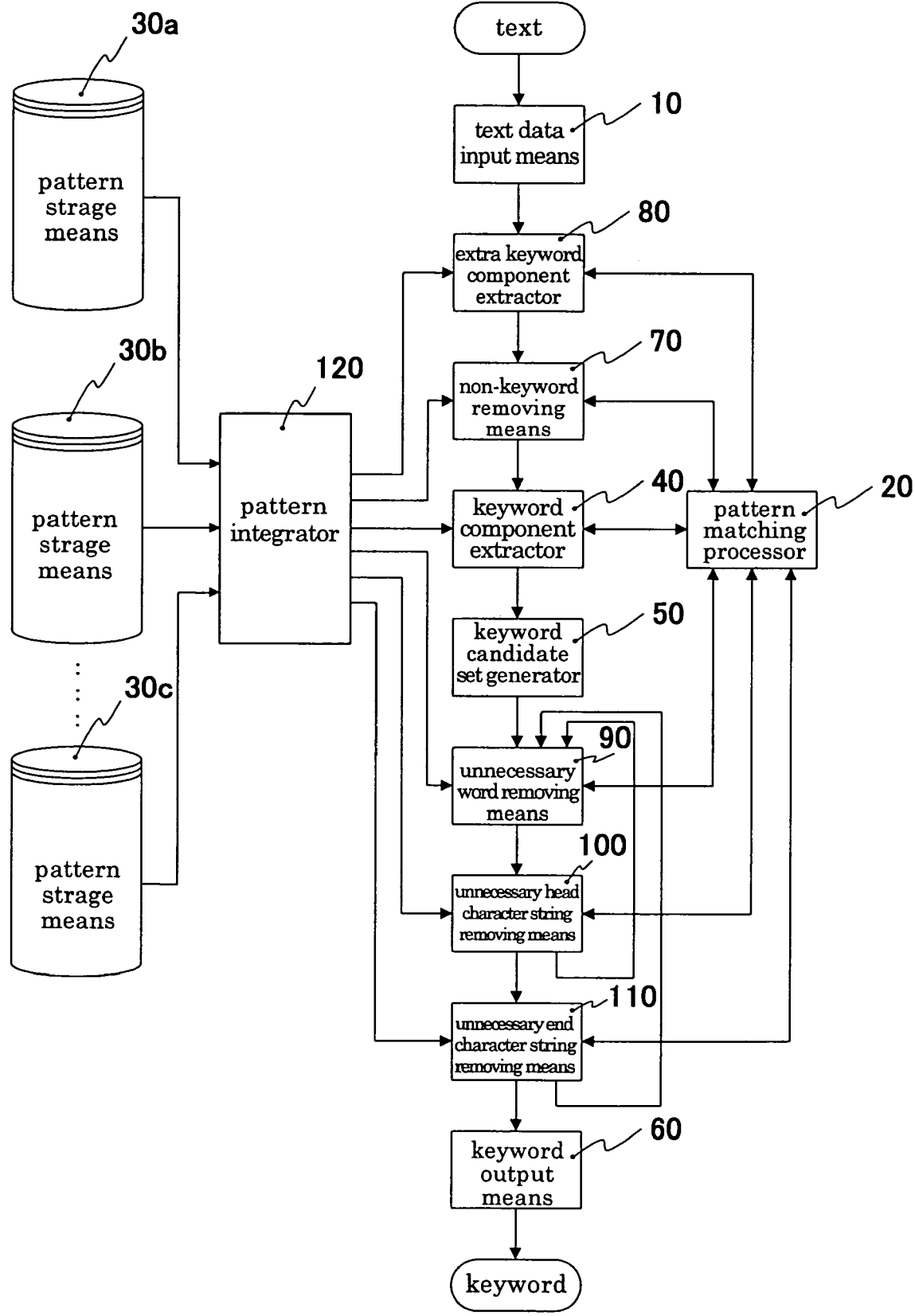
FIG. 9 is a diagram illustrating a keyword extracting device according to EMBODIMENT 8.

FIG. 9 is a diagram illustrating a keyword extracting device according to EMBODIMENT 8 for carrying out the present invention.

In FIG. 9, the same reference numerals as those in FIGS. 1 to 8 denote the same or corresponding portions.

In FIG. 9, 120 denotes pattern integrator.

Moreover, pattern matching processor 20 does not need to apply a plurality of patterns described in EMBODIMENT 7 at the same time but may be the means described in EMBODIMENT 1.

The pattern integrator 120 integrates various patterns of each kind in each pattern storage means into an integrated pattern for each kind and output the integrated pattern. In the integration of each pattern, the integrated pattern is constituted in consideration of the property of (C2) in the matching such that a character string which might be matched with each pattern, is the closest to the head and has the greatest length is set to be a matching result. In other words, there is constituted such an integrated pattern that selection, concatenation, repetition and the like of the component of each pattern are expanded, thereby aligning patterns having the same character string length which might be matched and setting the pattern having a greater character string length to be a selection choice in descending order.

Keyword component extractor 40, non-keyword removing means 70, extra keyword component extractor 80, unnecessary word removing means 90, unnecessary head character string removing means 100 and unnecessary end character string removing means 110 execute respective processing by using the pattern integrated by the pattern integrator 120.

The pattern integrating processing will be specifically described below.

For simplicity of description, a pattern in which patterns, having the same character string length to be matched, are arranged adjacent to each other is considered (as an aligned pattern hereinafter). The length of each character string in the aligned pattern is indicated with underlined number in the following description. For example, a following aligned pattern includes a pattern "A" having a length of 1 and a pattern "(BC|DE)" having a length of 2.

"1 A 2 (BC|DE)" (30)

The pattern integrating processing is implemented by constituting an aligned pattern corresponding to a pattern in which each pattern is a selection choice, and outputting an integrated pattern in which a pattern having a greater character string length that might be matched is set to be the selection choice in descending order. For example, the aligned pattern of (30) is finally output as a following integrated pattern (31).

"((BC|DE)|A)" (31).

Referring to a character string length which might be matched, an upper limit may be provided. A pattern exceeding the upper limit is removed out from an integrated pattern. Consequently, it is possible to remove such an extremely long pattern as not to be matched, thereby shortening the integrated pattern and enhancing the efficiency of the matching. While the character string length of an input text is an obvious example of the upper limit, approximately 20 characters are practically sufficient length in many cases.

Next, an aligned pattern corresponding to a certain pattern is obtained in the following manner.

A pattern having strings of normal characters corresponds to an aligned pattern having the length of the character string and the character string.

(example) "ABC"→"3 ABC"

Patterns such as "^" and "$" correspond to aligned patterns having the same character accompanied by a length of 0.

(example) "^"→"0^"

A pattern having a normal character or a character designated with character range between "["and "]" or "[^" and "]" corresponds to an aligned pattern having the pattern accompanied by a length of 1.

(example) "[A–E]"→"1[A–E]"

A pattern enclosed by "(" and ")" corresponds to an aligned pattern having characters in parentheses.

(example) "(FGH)"→"3 FGH"

Patterns interposing "|" correspond to an aligned pattern having each pattern rearranged, as a selection choice, corresponding to their length.

(example) "ABC|[A–E]|(FGH)"
→"3 ABC|1 [A–E]|3 (FGH)"
→"1 [A–E]|3 ABC|(FGH)"

A concatenation of patterns corresponds to an aligned pattern in which each pattern in parentheses is expanded so as to form selection choices and rearranged corresponding to their length.

(example) "(A|BC) (F|GH)"
→"1 A 2 BC" "1 F 2 GH"
→"2 AF 3 AGH|BCF 4 BCGH"

A pattern having "{m, n}" (m and n are integers equal to or greater than 0) provided therebehind corresponds to an aligned pattern having the pattern provided with "{p}" (m≦p≦n) therebehind and accompanied by a length which is p times as great as a length of the pattern. In the case of p=0, a pattern of an empty character string (for example, "( )") is simply given accompanied by a length of 0. Moreover, in the case of p=1, "{1}" can be omitted. Furthermore, "{p}" does not need to be provided behind the pattern corresponding to the length of 0.

(example) "(A|BC) {0, 2}"
→"1 A 2 BC" {0, 2}
→"0 ( )|1 A 2 BC|2 A {2} 4 (BC) {2}"
→"0 ( )|1 A 2 BC|A {2} 4 (BC) {2}"

A pattern having "{m}", "{m, }", "*", "+" or "?" provided therebehind corresponds to an aligned pattern having the pattern with "{m, m}", "{m, ∞}", "{0, ∞}", "1, ∞}" or "{0, 1} provided therebehind (m is an integer equal to or greater than 0), respectively.

(example) "([A–E]|BC) {2}"
→"1 [A–E]|2 BC" {2}
→"2 [A–E] {2} 4 (BC) {2}"

In the case in which n is very great or infinite in the above-mentioned repetition, it is supposed that an upper limit is provided on the numbers of expansions of repetitions and the repetition of the pattern which exceeds the upper limit is so decided as not to be matched and is therefore removed, thereby preventing an integrated pattern from being enormous. Also in the case in which such an upper limit is not provided, it is supposed that an upper limit is provided for a character string length which might be matched and the expansion of repetition exceeding the upper limit is not performed. This is the same as in the case in which the concatenation of patterns is to be expanded.

Referring to an unnecessary word pattern and a necessary word pattern, matching is carried out for the whole character string of a keyword candidate. Therefore, the above-mentioned pattern integrating processing is not carried out and an integrated pattern having each pattern as a selection choice may be simply output.

According to EMBODIMENT 8, thus, it is possible to implement, through a single pattern processing, the application of various patterns stored in various pattern storage means corresponding to the type and field of a text, the kind of a stored pattern and the like. In the integration of each pattern through the pattern integrating means, furthermore, the integrated pattern is constituted in consideration of the property of (C2) in the matching such that a character string which is matched in the closest to the head and has the greatest length is set to be a matching result. In the description of the selection choice of each pattern, therefore, it is not necessary to take the property of (C2) into consideration. Consequently, the description can be carried out more flexibly.

Embodiment 9

Figure 10:
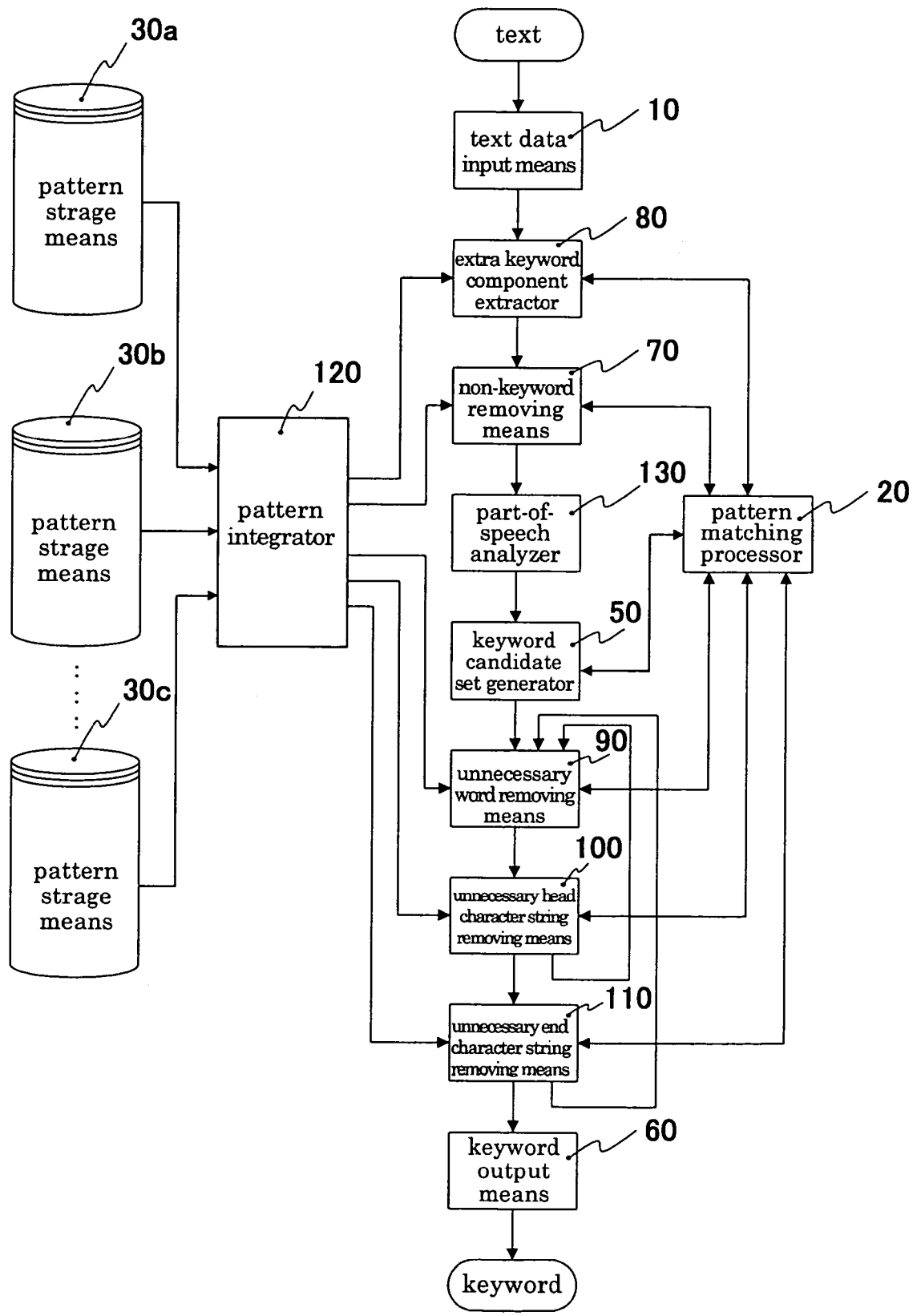
FIG. 10 is a diagram illustrating a keyword extracting device according to EMBODIMENT 9.
Figure 11:
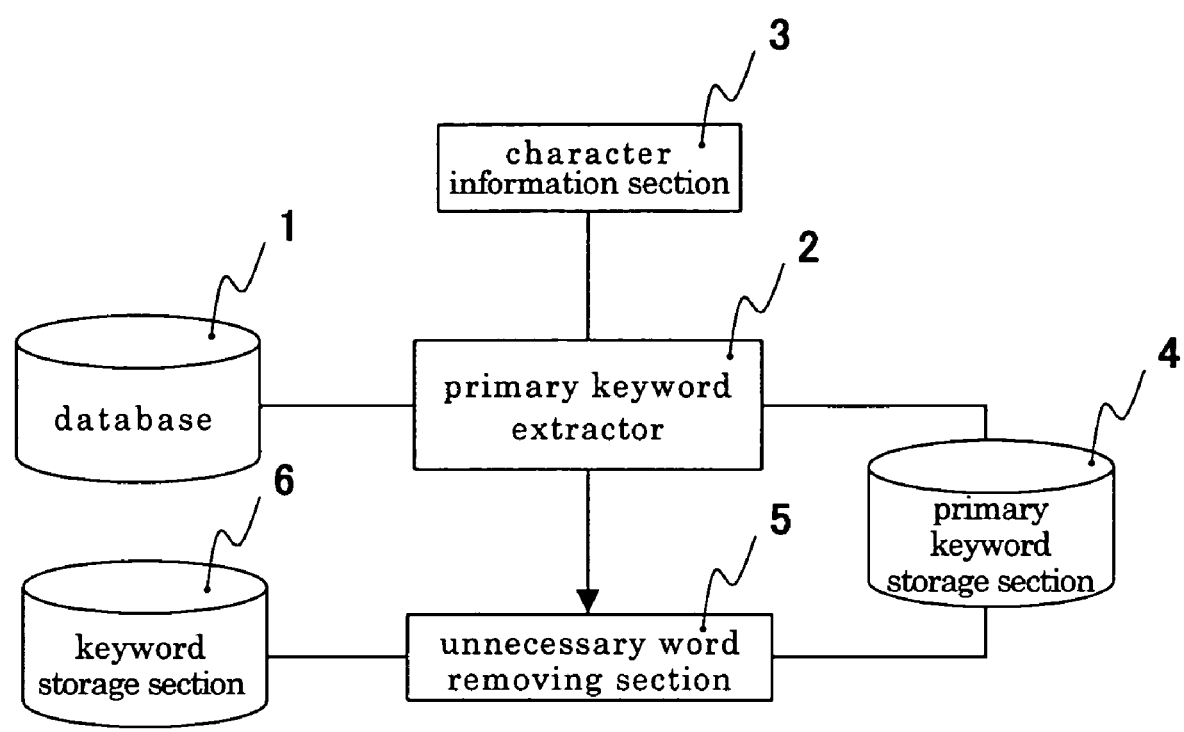
FIG. 11 is a diagram illustrating a conventional keyword extracting device.

FIG. 10 is a diagram illustrating a keyword extracting device according to EMBODIMENT 9 for carrying out the present invention.

In FIG. 10, the same reference numerals as those in FIGS. 1 to 9 denote the same or corresponding portions.

In FIG. 10, part-of-speech analyzer 130 extracts words or morphemes and analyzes their part-of-speech for a text input from non-keyword removing means 70. As means for extracting words or morphemes from an input text to analyze a part-of-speech, morphological analysis and part-of-speech tagging can be used for Japanese and English texts respectively, for example.

Keyword candidate set generator 50 sets, as a keyword candidate, a sequence of words or morphemes corresponding to a predetermined part-of-speech sequence to be the keyword candidate from the output of the part-of-speech analyzer 130.

As a simple example of such a part-of-speech sequence, in the case in which a sequence of nouns is to be a keyword candidate described below, when following text (32) is analyzed by the part-of-speech analyzer 130, the result (33) is obtained.

"an encryption apparatus is used" (32)

"an<article>encryption<noun>apparatus<noun>is<verb>used<verb>" (33)

In (33), a part-of-speech is indicated by < > after each morpheme as a result of the analysis. Consequently, following string (34) is generated as a keyword candidate (although the text (32) is represented by sequence <noun><noun><particle><verb><auxiliary verb> in Japanese, "encryption" and "apparatus" appear as above consecutive nouns and the string (34) of "encryption apparatus" is generated therefrom).

"encryption apparatus" (34)

If the necessary end pattern of (25) is prepared for the keyword candidate of (34), a part of "apparatus" is decided to be unnecessary, and following strings (35) is obtained as a final keyword candidate.

"encryption" (35)

Also in the English text, similarly, in the case in which a text (36) is analyzed, for example, and a result (37) is obtained, "cipher device" is generated as a keyword candidate.

"A cipher device is used . . . " (36)

"A <article>cipher<noun>device<noun>is <verb>used <verb> . . . " (37)

If an unnecessary end pattern of (38) is prepared, for example, following strings (39) is obtained as a final keyword candidate.

"(device|method)(s|)$" (38)

"cipher" (39)

In (38), it is to be noted that a space indicative of a break of a word is put on the head and a pattern corresponding to a plural form is used.

Various methods can be applied to extract a sequence of words or morphemes corresponding to a predetermined part-of-speech sequence to be a keyword candidate. As one of the methods, it is supposed that a pattern is used.

In the case in which a part-of-speech is indicated by < > after a word or a morpheme and is partitioned with a space and is sent as an output of the part-of-speech analyzer 130 as in (33) or (37) and each word or morpheme does not include characters of "<" and ">", pattern matching processor 20 may be used to take out a sequence of noun, for example, with following pattern (40). After extracting a portion matched with the pattern (40), deleting a part of the part-of-speech enclosed by < > and properly deleting a space for a break depending on a language.

"([^ < >]+<noun>)+" (40)

According to EMBODIMENT 9, thus, it is possible to carry out a flexible unnecessary character string processing using a pattern for a keyword candidate obtained by performing the part-of-speech analysis.

INDUSTRIAL APPLICABILITY

As described above, according to the first aspect of the present invention, a keyword extracting device is characterized by text data input means for inputting a text, pattern processing means for carrying out matching and replacement of a character string based on pattern in a regular expression or its equivalent, pattern storage means having at least a keyword component pattern representing a character string capable of being a component of a keyword, keyword component extracting means for extracting, as keyword components, all character strings which are matched with the keyword component pattern and are not overlapped with each other by using the pattern processing means for a text, keyword candidate set generating means for generating a keyword candidate set from each keyword component, and keyword output means for outputting each keyword candidate of a keyword candidate set as a keyword. By using a pattern in regular expression or its equivalent having a high descriptive property, therefore, it is possible to easily implement flexible keyword extraction which is not peculiar to the species of characters.

According to the second aspect of the present invention, moreover, a keyword extracting device is characterized by keyword candidate set generating means for generating a keyword candidate set by exactly using each keyword component as a keyword candidate. Therefore, there is an advantage that an element concept can easily be extracted.

According to the third aspect of the present invention, furthermore, a keyword extracting device is characterized by keyword component extracting means for recording an extracting position while extracting, as keyword components, all character strings which are matched with a keyword component pattern and are not overlapped with each other by using the pattern processing means for a text, and keyword candidate set generating means for generating a keyword candidate set by coupling, as one keyword candidate, keyword components decided to be continuous with a character string length of each keyword component from the extracting position over a text and exactly using a single keyword component as a keyword candidate. Therefore, there is an advantage that a composite keyword can easily be extracted.

According to the fourth aspect of the present invention, moreover, a keyword extracting device is characterized by keyword candidate set generating means for generating a keyword candidate set by using continuous keyword components over a text as a single keyword candidate respectively and coupling the preceding keyword component with the following keyword component to make a keyword candidate, while exactly using a single keyword component as a keyword candidate. Therefore, it is possible to extract both an element concept and a composite keyword.

According to the fifth aspect of the present invention, furthermore, a keyword extracting device is characterized by keyword candidate set generating means for collecting, into one, overlapped keyword candidates in a keyword candidate set. Therefore, it is possible to avoid redundancy in a subsequent processing.

According to the sixth aspect of the present invention, moreover, a keyword extracting device is characterized by pattern storage means having at least a keyword component pattern representing a character string capable of being a component of a keyword and a non-keyword candidate pattern representing a portion which cannot be a candidate of a keyword, and non-keyword removing means for searching all character strings which are matched with the non-keyword candidate pattern and are not overlapped with each other and for replacing the character string with a special character string with which any pattern is never matched by using the pattern processing means for a text. Therefore, it is possible to prevent an unnecessary keyword component from being extracted.

According to the seventh aspect of the present invention, furthermore, a keyword extracting device is characterized by pattern storage means having at least a keyword component pattern representing a character string capable of being a component of a keyword and an extra keyword component pattern representing a keyword component which is hard to cover with the keyword component pattern, extra keyword component extracting means for extracting, as extra keyword components, all character strings which are matched with the extra keyword component pattern and are not overlapped with each other, recording an extracting position, and converting each character string matched in a text into a special character string with which any pattern is never matched by using the pattern processing means for a text, and keyword candidate set generating means for generating a keyword candidate set from the keyword component and the extra keyword component. Therefore, it is possible to previously extract a keyword component which is hard to cover with a keyword component pattern or cannot be extracted through the removal of a non-keyword candidate.

According to the eighth aspect of the present invention, moreover, a keyword extracting device is characterized by pattern storage means having at least a keyword component pattern representing a character string capable of being a component of a keyword and an unnecessary word pattern representing an unnecessary word, and unnecessary word removing means for removing an unnecessary word matched with the unnecessary word pattern from a keyword candidate set by using the pattern processing means for a whole character string of each keyword candidate of the keyword candidate set. Therefore, it is possible to use a pattern having a high descriptive property to remove an unnecessary keyword candidate.

According to the ninth aspect of the present invention, furthermore, a keyword extracting device is characterized by pattern storage means having at least a keyword component pattern representing a character string capable of being a component of a keyword, a necessary word pattern representing a necessary word and an unnecessary word pattern representing an unnecessary word, and unnecessary word removing means for removing an unnecessary word which is not matched with the necessary word pattern but is matched with the unnecessary word pattern from a keyword candidate set by using the pattern processing means for a whole character string of each keyword candidate of the keyword candidate set. Therefore, it is possible to prevent a keyword candidate from being deleted with the unnecessary word pattern by mistake.

According to the tenth aspect of the present invention, moreover, a keyword extracting device is characterized by pattern storage means having at least a keyword component pattern representing a character string capable of being a component of a keyword and an unnecessary head pattern representing an unnecessary head character string, and unnecessary head character string removing means for removing a portion matched with the unnecessary head pattern from a keyword candidate matched with the unnecessary head pattern, by using the pattern processing means for a head character string of each keyword candidate of the keyword candidate set, if this removal results in an empty character string, the original keyword candidate is deleted from a keyword candidate set. If the result of this removal is not an empty character string, the original keyword candidate is replaced by a keyword candidate in which an unnecessary head character string is removed. Therefore, it is possible to use a pattern having a high descriptive property to remove an unnecessary head character string in a keyword candidate.

According to the eleventh aspect of the present invention, furthermore, a keyword extracting device is characterized by pattern storage means having at least a keyword component pattern representing a character string capable of being a component of a keyword, an unnecessary head pattern representing an unnecessary head character string and a necessary head pattern representing a necessary head character string, and unnecessary head character string removing means for removing a portion matched with the unnecessary head pattern from a keyword candidate which is not matched with the necessary head pattern but is matched with the unnecessary head pattern, by using the pattern processing means for a head character string of each keyword candidate of the keyword candidate set, if this removal results in an empty character string, the original keyword candidate is deleted from a keyword candidate set. If the result of this removal is not an empty character string, the original keyword candidate is replaced by a keyword candidate in which an unnecessary head character string is removed. Therefore, it is possible to prevent a necessary head character string of a keyword candidate from being deleted with the unnecessary head pattern by mistake.

According to the twelfth aspect of the present invention, moreover, a keyword extracting device is characterized by pattern storage means having at least a keyword component pattern representing a character string capable of being a component of a keyword and an unnecessary end pattern representing an unnecessary end character string, and unnecessary end character string removing means for removing a portion matched with the unnecessary end pattern from a keyword candidate matched with the unnecessary end pattern, by using the pattern processing means for an end character string of each keyword candidate of the keyword candidate set, if this removal results in an empty character string, the original keyword candidate is deleted from a keyword candidate set. If the result of this removal is not an empty character string, the original keyword candidate is replaced by a keyword candidate in which an unnecessary end character string is removed. Therefore, it is possible to use a pattern having a high descriptive property to remove an unnecessary end character string in a keyword candidate.

According to the thirteenth aspect of the present invention, furthermore, a keyword extracting device is characterized by pattern storage means having at least a keyword component pattern representing a character string capable of being a component of a keyword, an unnecessary end pattern representing an unnecessary end character string and a necessary end pattern representing a necessary end character string, and unnecessary end character string removing means for removing a portion matched with the unnecessary end pattern from a keyword candidate which is not matched with the necessary end pattern but is matched with the unnecessary end pattern, by using the pattern processing means for an end character string of each keyword candidate of the keyword candidate set, if this removal results in an empty character string, the original keyword candidate is deleted from a keyword candidate set. If the result of this removal is not an empty character string, the original keyword candidate is replaced by a keyword candidate in which an unnecessary end character string is removed. Therefore, it is possible to prevent an end character string of a keyword candidate from being deleted with an unnecessary end pattern by mistake.

According to the fourteenth aspect of the present invention, moreover, a keyword extracting device is characterized in that keyword candidate, which is finally removed from a candidate set by applying two of the unnecessary word removing means, the unnecessary head character string removing means and the unnecessary end character string removing means or more in combination or by applying either the unnecessary head character string removing means or the unnecessary end character string removing means twice or more, is added to a selection choice of the unnecessary word pattern. Therefore, it is possible to avoid a redundant processing.

According to the fifteenth aspect of the present invention, furthermore, a keyword extracting device is characterized by a plurality of pattern storage means corresponding to a type and field of a text, a kind of a stored pattern and the like, and pattern processing means for simultaneously applying the same kind of patterns stored in each pattern storage means when applying various patterns and for setting, as a matching result, the longest character string which is matched at the headmost position in the text. Therefore, it is possible to enhance the reusability of information to be used for the keyword extraction and to cause the information to correspond to various texts flexibly and efficiently.

According to the sixteenth aspect of the present invention, moreover, a keyword extracting device is characterized by pattern processing means for simultaneously applying a pattern stored in each pattern storage means and for setting, as a matching result, a character string matched with any pattern, thereby stopping application of other patterns, in relation to an unnecessary word pattern and a necessary word pattern. Therefore, it is possible to avoid a redundant pattern processing for an unnecessary word pattern and a necessary word pattern.

According to the seventeenth aspect of the present invention, furthermore, a keyword extracting device is characterized by a plurality of pattern storage means corresponding to a type and field of a text, a kind of a stored pattern and the like, and pattern integrating means for expanding selection, concatenation, repetition and the like in a pattern if necessary, and for integrating and outputting, for each kind of pattern, various patterns stored in the pattern storage means while aligning a component of a pattern in relation to a character string length which might be matched. Therefore, it is possible to implement, through a single pattern processing, the application of various patterns stored in each kind of pattern storage means corresponding to the type and field of a text, the kind of a stored pattern and the like. In the integration of each pattern through the pattern integrating means, furthermore, the integrated pattern is constituted in consideration of the property of (C2) in the matching such that a character string which might be matched with each pattern, is the closest to the head and has the greatest length is set to be a matching result. In the description of the selection choice of each pattern, therefore, it is not necessary to take the property of (C2) into consideration. Consequently, the description can be carried out more flexibly.

According to the eighteenth aspect of the present invention, moreover, a keyword extracting device is characterized by pattern integrating means for providing an upper limit for a character string length which might be matched, and for integrating and outputting, for each kind of pattern, various patterns stored in the pattern storage means while removing a component of a pattern which exceeds the upper limit. Therefore, it is possible to shorten the integrated pattern and to enhance the efficiency of the matching.

According to the nineteenth aspect of the present invention, furthermore, a keyword extracting device is characterized by pattern integrating means for providing an upper limit of the number of expansions for the repetition of patterns to exclude the repetition of a pattern which exceeds the upper limit, thereby integrating and outputting, for each kind of pattern, various patterns stored in the pattern storage means. Therefore, it is possible to prevent the integrated pattern from being enormous.

According to the twentieth aspect of the present invention, moreover, a keyword extracting device is characterized by pattern integrating means for outputting a pattern having, as a selection choice, a pattern stored in each pattern storage means in relation to an unnecessary word pattern and a necessary word pattern. Therefore, it is possible to avoid a redundant pattern integrating processing.

According to the twenty-first aspect of the present invention, furthermore, a keyword extracting device is characterized by text data input means for inputting a text, part-of-speech analyzing means to analyze a part-of-speech of each word in the input text, keyword candidate set generating means for generating, as a keyword candidate, a word string corresponding to a prescribed sequence of part-of-speeches from a result of the part-of-speech analyzing, and keyword output means for outputting each keyword candidate of the keyword candidate set as a keyword. Therefore, it is possible to easily implement the keyword extraction by using part-of-speech analysis in place of the keyword component extracting means and the keyword component pattern.

According to the twenty-second aspect of the present invention, moreover, a keyword extracting device is characterized by keyword candidate set generating means for collecting, into one, keyword candidates repeated in the keyword candidate set. Therefore, it is possible to avoid redundancy in a subsequent processing.

According to the twenty-third aspect of the present invention, furthermore, a keyword extracting device is characterized by pattern processing means for carrying out matching and replacement of a character string based on pattern in a regular expression or its equivalent and pattern storage means for storing a pattern representing a character string to be used for the matching and the replacement in the pattern processing means. Therefore, using the stored pattern, it is possible to flexibly remove an unnecessary character from keyword candidate obtained by the part-of-speech analysis.

According to the twenty-fourth aspect of the present invention, moreover, a keyword extracting device is characterized by pattern storage means having at least a keyword component pattern representing a character string capable of being a component of a keyword, a non-keyword candidate pattern representing a portion which cannot be a candidate of a keyword, and non-keyword removing means for searching all character strings which are matched with the non-keyword candidate pattern and are not overlapped with each other and for replacing the character string with a special character string with which any pattern is never matched by using the pattern processing means for the text. Therefore, it is possible to prevent an unnecessary keyword component from being extracted.

According to the twenty-fifth aspect of the present invention, furthermore, a keyword extracting device is characterized by pattern storage means having at least a keyword component pattern representing a character string capable of being a component of a keyword and an extra keyword component pattern representing a keyword component which is hard to cover with the keyword component pattern, extra keyword component extractor for extracting, as extra keyword components, all character strings which are matched with the extra keyword component pattern and are not overlapped with each other, recording an extracting position, and converting each character string matched in the text into a special character string with which any pattern is never matched by using the pattern processing means for a text, and keyword candidate set generating means for generating a keyword candidate set from the keyword component and the extra keyword component. Therefore, it is possible to previously extract a keyword component which is hard to cover with a keyword component pattern or cannot be extracted through removal of an non-keyword candidate.

According to the twenty-sixth aspect of the present invention, moreover, a keyword extracting device is characterized by pattern storage means having at least a keyword component pattern representing a character string capable of being a component of a keyword and an unnecessary word pattern representing an unnecessary word, and unnecessary word removing means for removing a character string matched with the unnecessary word pattern from a keyword candidate set by using the pattern processing means for a whole character string of each keyword candidate of the keyword candidate set. Therefore, it is possible to use a pattern having a high descriptive property to remove an unnecessary keyword candidate.

According to the twenty-seventh aspect of the present invention, furthermore, a keyword extracting device is characterized by pattern storage means having at least a keyword component pattern representing a character string capable of being a component of a keyword, a necessary word pattern representing a necessary word and an unnecessary word pattern representing an unnecessary word, and unnecessary word removing means for removing a character string which is not matched with the necessary word pattern but is matched with the unnecessary word pattern from a keyword candidate set by using the pattern processing means for a whole character string of each keyword candidate of the keyword candidate set. Therefore, it is possible to prevent a keyword candidate from being deleted with an unnecessary word pattern by mistake.

According to the twenty-eighth aspect of the present invention, moreover, a keyword extracting device is characterized by pattern storage means having at least a keyword component pattern representing a character string capable of being a component of a keyword and an unnecessary head pattern representing an unnecessary head character string, and unnecessary head character string removing means for removing a portion matched with the unnecessary head pattern from a keyword candidate matched with the unnecessary head pattern, by using the pattern processing means for a head character string of each keyword candidate of the keyword candidate set, if this removal results in an empty character string, the original keyword candidate is deleted from a keyword candidate set. If the result of this removal is not an empty character string, the original keyword candidate is replaced by a keyword candidate in which an unnecessary head character string is removed. Therefore, it is possible to use a pattern having a high descriptive property to remove an unnecessary head character string in a keyword candidate.

According to the twenty-ninth aspect of the present invention, furthermore, a keyword extracting device is characterized by pattern storage means having at least a keyword component pattern representing a character string capable of being a component of a keyword and an unnecessary head pattern representing an unnecessary head character string and a necessary head pattern representing a necessary head character string, and unnecessary head character string removing means for removing a portion matched with the unnecessary head pattern from a keyword candidate which is not matched with the necessary head pattern but is matched with the unnecessary head pattern, by using the pattern processing means for a head character string of each keyword candidate of the keyword candidate set, if this removal results in an empty character string, the original keyword candidate is deleted from a keyword candidate set. If the result of this removal is not an empty character string, the original keyword candidate is replaced by a keyword candidate in which an unnecessary head character string is removed. Therefore, it is possible to prevent a necessary head character string of a keyword candidate from being deleted with the unnecessary head pattern by mistake.

According to the thirtieth aspect of the present invention, moreover, a keyword extracting device is characterized by pattern storage means having at least a keyword component pattern representing a character string capable of being a component of a keyword and an unnecessary end pattern representing an unnecessary end character string, and unnecessary end character string removing means for removing a portion matched with the unnecessary end pattern from a keyword candidate matched with the unnecessary end pattern, by using the pattern processing means for an end character string of each keyword candidate of the keyword candidate set, if this removal results in an empty character string, the original keyword candidate is deleted from a keyword candidate set. If the result of this removal is not an empty character string, the original keyword candidate is replaced by a keyword candidate in which an unnecessary end character string is removed. Therefore, it is possible to use a pattern having a high descriptive property to remove an unnecessary end character string in a keyword candidate.

According to the thirty-first aspect of the present invention, furthermore, a keyword extracting device is characterized by pattern storage means having at least a keyword component pattern representing a character string capable of being a component of a keyword and an unnecessary end pattern representing an unnecessary end character string and a necessary end pattern representing a necessary end character string, and unnecessary end character string removing means for removing a portion matched with the unnecessary end pattern from a keyword candidate which is not matched with the necessary end pattern but is matched with the unnecessary end pattern, by using the pattern processing means for an end character string of each keyword candidate of the keyword candidate set, if this removal results in an empty character string, the original keyword candidate is deleted from a keyword candidate set. If the result of this removal is not an empty character string, the original keyword candidate is replaced by a keyword candidate in which an unnecessary end character string is removed. Therefore, it is possible to prevent an end character string of a keyword candidate from being deleted with an unnecessary end pattern by mistake.

According to the thirty-second aspect of the present invention, moreover, a keyword extracting device is characterized in that a keyword candidate, which is finally removed from a candidate set by applying two of the unnecessary word removing means, the unnecessary head character string removing means and the unnecessary end character string removing means or more in combination or by applying either the unnecessary head character string removing means or the unnecessary end character string removing means twice or more, is added to a selection choice of the unnecessary word pattern. Therefore, it is possible to avoid a redundant processing.

According to the thirty-third aspect of the present invention, furthermore, a keyword extracting device is characterized by a plurality of pattern storage means corresponding to a type and field of a text, a kind of a stored pattern and the like, and pattern processing means for simultaneously applying the same kind of patterns stored in each pattern storage means when applying various patterns and for setting, as a matching result, the longest character string which is matched at the headmost position in the text. Therefore, it is possible to enhance the reusability of information to be used for the keyword extraction and to cause the information to correspond to various texts flexibly and efficiently.

According to the thirty-fourth aspect of the present invention, moreover, a keyword extracting device is characterized by pattern processing means for simultaneously applying a pattern stored in each pattern storage means and for setting, as a matching result, a character string matched with any pattern, thereby stopping application of other patterns, in relation to an unnecessary word pattern and a necessary word pattern. Therefore, it is possible to avoid a redundant pattern processing for an unnecessary word pattern and a necessary word pattern.

According to the thirty-fifth aspect of the present invention, furthermore, a keyword extracting device is characterized by a plurality of pattern storage means corresponding to a type and field of a text, a kind of a stored pattern and the like, and pattern integrating means for expanding selection, concatenation, repetition and the like in a pattern if necessary, and for integrating and outputting, for each kind of pattern, various patterns stored in the pattern storage means while aligning a component of a pattern in relation to a character string length which might be matched. Therefore, it is possible to implement, through a single pattern processing, the application of each kind of pattern stored in various pattern storage means corresponding to the type and field of a text, the kind of a stored pattern and the like. In the integration of each pattern through the pattern integrating means, furthermore, the integrated pattern is constituted in consideration of the property of (C2) in the matching such that a character string which might be matched with each pattern, is the closest to the head and has the greatest length is set to be a matching result. In the description of the selection choice of each pattern, therefore, it is not necessary to take the property of (C2) into consideration. Consequently, the description can be carried out more flexibly.

According to the thirty-sixth aspect of the present invention, moreover, a keyword extracting device is characterized by pattern integrating means for providing an upper limit for a character string length which might be matched, and for integrating and outputting, for each kind of pattern, various patterns stored in the pattern storage means while removing a component of a pattern which exceeds the upper limit. Therefore, it is possible to shorten the integrated pattern and to enhance the efficiency of the matching.

According to the thirty-seventh aspect of the present invention, furthermore, a keyword extracting device is characterized by pattern integrating means for providing an upper limit of the number of expansions for the repetition of patterns to exclude the repetition of a pattern which exceeds the upper limit, thereby integrating and outputting, for each kind of pattern, various patterns stored in the pattern storage means. Therefore, it is possible to prevent the integrated pattern from being enormous.

According to the thirty-eighth aspect of the present invention, moreover, a keyword extracting device is characterized by pattern integrating means for outputting a pattern having, as a selection choice, a pattern stored in each pattern storage means in relation to an unnecessary word pattern and a necessary word pattern. Therefore, it is possible to avoid a redundant pattern integrating processing.

The invention claimed is:

1. A computer implemented keyword extracting device comprising:
    a text data input part for inputting a text,
    a pattern storage part storing at least a pattern to generate keyword candidates, said pattern is represented by character strings in regular expression or its equivalent,
    an extracting part for extracting character strings from the text through pattern matching using said pattern stored in said pattern storage part,
    a keyword candidate generating part generating keyword candidates, the keyword candidates including at least portions of the character strings being extracted at the extracting part, and
    an output part outputting the keyword candidates as keywords,
    wherein the pattern to generate keyword candidates is an unnecessary pattern representing unnecessary head or end character strings,
    the keyword candidate generating part includes an unnecessary character string removing part, and
    said unnecessary character string removing part extracts keyword candidates including character strings matched with the unnecessary pattern from the keyword candidates so that (i) if the extracted keyword candidates are same as character strings matched with the unnecessary pattern, removes the extracted keyword candidates, and (ii) if the extracted keyword candidates are not same as character strings matched with the unnecessary pattern, takes the keyword candidates, in which said matched character string is removed, as a keyword candidates.

2. A computer implemented keyword extracting device of claim 1,
    wherein the pattern storage part stores a keyword component pattern represented by character strings configured to be keyword components in regular expression or its equivalent, and
    the extracting part extracts character strings matched with the keyword component pattern through pattern matching while not extracting a character string overlapping with another character string already extracted.

3. A computer implemented keyword extracting device of claim 2 further comprising an extra keyword component extracting part;
    wherein the pattern to generate keyword candidates is an extra keyword component pattern, which represents keyword components hardly matched with the keyword component pattern,
    the extra keyword component extracting part extracts character strings matched with the extra keyword component pattern through pattern matching and replaces the extracted character strings in the text with special character strings,
    the extracting part extracts character strings matched with the keyword component pattern, from the text being replaced at the extra keyword component extracting part, and
    the keyword candidate generating part takes the character strings being extracted at the extra keyword component extracting part as keyword candidates as well as the character strings extracted at the extracting part.

4. A computer implemented keyword extracting device of claim 2:
    wherein the keyword component pattern including patterns corresponding to type or field of text or kind of pattern
    the extracting part extracts character strings based on said patterns.

5. A computer implemented keyword extracting device of claim 4:
    wherein the patterns includes patterns of a same kind, and
    the extracting part carries out the pattern matching applying said patterns of the same kind at a same time to extract a longest character string among character strings matched at a same headmost position in the text.

6. A computer implemented keyword extracting device of claim 5 further comprising a pattern integrating part for integrating the patterns to generate a new pattern of each kind, through a process including at least either of selection, concatenation, and repetition, while sorting components of the pattern in descending order of string lengths to be matched.

7. A computer implemented keyword extracting device of claim 1 further comprising a part-of-speech analyzing part for dividing the text into words and analyzing a part-of-speech of each divided word,
wherein the extracting part extracts character strings corresponding to a prescribed sequence of part-of-speeches from the text, based on a result of the part-of-speech analysis at the part-of-speech analyzing part.

8. A computer implemented keyword extracting device of claim 1,
wherein the extracting part extracts the character strings with their positions in the text, and
the keyword candidate generating part generates a keyword candidate by coupling the extracted character strings which are recognized as continuous with each other from their string length and positions in the text.

9. A computer implemented keyword extracting device of claim 1:
wherein the pattern to generate keyword candidates is an unnecessary word pattern representing unnecessary words, and
the keyword candidate generating part includes an unnecessary word removing part, said unnecessary word removing part extracts character strings matched with the unnecessary word pattern from the text through pattern matching and, if same character strings thereof are included in the keyword candidates, removes the character strings from the keyword candidates.

10. A computer implemented keyword extracting device of claim 9:
wherein the pattern to generate keyword candidates further includes a necessary word pattern representing necessary words, and
the unnecessary word removing part does not remove the character strings matched with the necessary word pattern.

11. A computer implemented keyword extracting device of claim 1:
wherein the pattern to generate keyword candidates further includes a necessary pattern representing necessary head or end character strings, and
if the keyword candidate including character strings to be removed is a character strings matching with the necessary pattern, the unnecessary character string removing part does not perform said removal concerning with the keyword candidate.

12. A computer implemented keyword extracting device of claim 1:
wherein the pattern to generate keyword candidates includes patterns corresponding to type or field of text kind of pattern, and
the keyword candidate generating part generates the keyword candidates based on the patterns.

13. A computer implemented keyword extracting device of claim 12:
wherein the patterns includes patterns of a same kind, and
the keyword candidate generating part carries out the pattern matching, for the text or the keyword candidates, applying said patterns of the same kind at a same time to extract a longest character string among character strings matched at a same headmost position to generate keyword candidates based an the extracted character string.

14. A computer implemented keyword extracting device of claim 12:
wherein the patterns includes unnecessary word patterns or necessary word patterns of a same kind, and
the keyword candidate generating part includes an unnecessary word removing part, said unnecessary word removing part carries out pattern matching using the unnecessary word patterns or the necessary word patterns at a same time for the text, and if any of the patterns is matched, the other patterns are not used and, if same character strings thereof are included in the keyword candidate, removes the character strings from the keyword candidate.

15. A computer implemented keyword extracting device of claim 12 further comprising a pattern integrating part for integrating the patterns to generate a new pattern of each kind, through a process including at least either of selection, concatenation, and repetition, while sorting components of the pattern in descending order of string lengths to be matched.

16. A computer implemented keyword extracting device of claim 15:
wherein the patterns include unnecessary word patterns or necessary word patterns of a same kind, and
the pattern integrating part generates a new pattern having the patterns of the same kind as a selection choice with regard to the unnecessary word patterns and necessary word patterns.

17. A computer implemented keyword extracting device comprising:
a text data input part for inputting a text.
a pattern storage part storing at least a pattern to generate keyword candidates, said pattern is represented by character strings in regular expression or its equivalent,
an extracting part for extracting character strings from the text through pattern matching using said pattern stored in said pattern storage part,
a keyword candidate generating part generating keyword candidates, the keyword candidates including at least portions of the character strings being extracted at the extracting part, and
a part-of-speech analyzing part for dividing the text into words and analyzing a part-of-speech of each divided word,
wherein the extracting part extracts character strings corresponding to a prescribed sequence of part-of-speeches from the text, based on a result of the part-of-speech analysis at the part-of-speech analyzing part,
the pattern to generate keyword candidates is an extra keyword component pattern, which represents keyword components hardly generated as character strings corresponding to the prescribed sequence of part-of-speeches,
the extra keyword component extracting part extracts character strings matched with the extra keyword component pattern through pattern matching and replaces the extracted character strings in the text with special character strings,
the extracting part extracts character strings corresponding to the prescribed sequence of part-of-speeches from the text being replaced at the extra keyword component extracting part, based on a result of the part-of-speech analysis at the part-of-speech analyzing part,
the keyword candidate generating part takes the character strings being extracted at the extra keyword component extracting part as the keyword candidates as well as the character strings extracted at the extracting part strings extracts at the extracting part, and an outputting part outputting the keyword candidates as keywords.

* * * * *